US012771420B2

(12) United States Patent
Elshafie et al.

(10) Patent No.: US 12,771,420 B2
(45) Date of Patent: Oct. 20, 2026

(54) CHANNEL STATE INFORMATION REPORTING DURING DISCONTINUOUS RECEPTION INACTIVE PERIODS USING LOW-POWER WAKE UP RECEIVER

(71) Applicant: QUALCOMM Incorporated, San Diego, CA (US)

(72) Inventors: Ahmed Elshafie, San Diego, CA (US); Yuchul Kim, San Diego, CA (US); Linhai He, San Diego, CA (US); Huilin Xu, Temecula, CA (US)

(73) Assignee: QUALCOMM Incorproated, San Diego, CA (US)

( * ) Notice: Subject to any disclaimer, the term of this patent is extended or adjusted under 35 U.S.C. 154(b) by 359 days.

(21) Appl. No.: 18/466,655

(22) Filed: Sep. 13, 2023

(65) Prior Publication Data

US 2025/0088241 A1 Mar. 13, 2025

(51) Int. Cl.
*H04W 76/11* (2018.01)
*H04B 7/06* (2006.01)
(Continued)

(52) U.S. Cl.
CPC ......... *H04B 7/0626* (2013.01); *H04B 17/309* (2015.01); *H04W 52/0229* (2013.01)

(58) Field of Classification Search
CPC ... H04B 17/309; H04B 7/0626; H04W 24/10; H04W 52/0216; H04W 52/0229;
(Continued)

(56) References Cited

U.S. PATENT DOCUMENTS

2020/0196241 A1* 6/2020 Lou .................. H04W 52/0229
2020/0413340 A1* 12/2020 Nam .................. H04W 52/028
(Continued)

OTHER PUBLICATIONS

CATT: "Physical Layer Signals and Procedures for Low-power WUS", 3GPP TSG RAN WG1 #110bis-e, R1-2208962, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, 4 Pages, XP052276882, section 2.4.
(Continued)

*Primary Examiner* — Phuc H Tran
(74) *Attorney, Agent, or Firm* — Polsinelli

(57) ABSTRACT

Systems and techniques are provided for wireless communications. A process can include receiving, using a low-power wake-up receiver (LP-WUR) of a network entity (e.g., a UE), a low-power signal indicative of configuration information for a channel state information (CSI) report of the network entity. A configured receiver of the network entity can receive a CSI reference signal (CSI-RS), the configured receiver comprising the LP-WUR or a main radio (MR) of the network entity. The configured receiver can be determined based on the configuration information indicated by the low-power signal. The network entity can transmit a CSI report corresponding to one or more measurements of the CSI-RS, wherein a transmission time of the CSI report is based on the configuration information indicated by the low-power signal.

28 Claims, 13 Drawing Sheets

(51) Int. Cl.
*H04B 17/309* (2015.01)
*H04W 52/02* (2009.01)

(58) Field of Classification Search
CPC ........... H04W 52/0235; H04W 52/028; H04W 52/0293; H04W 76/28; Y02D 30/70
See application file for complete search history.

(56) References Cited

U.S. PATENT DOCUMENTS

| | | | | |
|---|---|---|---|---|
| 2021/0136862 | A1 | 5/2021 | He et al. | |
| 2022/0124622 | A1* | 4/2022 | Islam | H04W 72/20 |
| 2022/0232476 | A1* | 7/2022 | Reial | H04W 24/10 |
| 2024/0114449 | A1 | 4/2024 | Elshafie et al. | |
| 2024/0155491 | A1* | 5/2024 | Cheng | H04W 52/0229 |
| 2024/0251353 | A1* | 7/2024 | Si | H04W 52/028 |
| 2024/0340794 | A1* | 10/2024 | Cheng | H04W 52/0235 |
| 2026/0052475 | A1* | 2/2026 | Cui | H04W 52/0216 |

OTHER PUBLICATIONS

International Search Report and Written Opinion—PCT/US2024/043094—ISA/EPO—Dec. 9, 2024.

Qualcomm Incorporated: "L1 Signal Design and Procedures for LP-WUR", 3GPP TSG RAN WG1 #113, R1-2305360, 3rd Generation Partnership Project (3GPP), Mobile Competence Centre, 650, Route Des Lucioles, F-06921 Sophia-Antipolis Cedex, France, vol. 3GPP RAN 1, No. Incheon, Korea, May 22, 2023-May 26, 2023, May 14, 2023, 30 Pages, XP052376431, section 3.4.

Qualcomm Incorporated: "Use of Low-power Receiver in RRC Connected", 3GPP TSG-RAN WG2 Meeting #123, R2-2307083 Resubmission of R2-2304715, Type Discussion, FS NR Lpwus, 3rd Generation Partnership Project (3GPP), Mobile Competence Centre, 650, Route Des Lucioles, F-06921 Sophia-Antipolis Cedex, France, vol. Ran WG2, No. Toulouse, FR, Aug. 21, 2023-Aug. 25, 2023, Aug. 11, 2023, 3 Pages, XP052442804, section 2.1.

* cited by examiner

CHANNEL STATE INFORMATION REPORTING DURING DISCONTINUOUS RECEPTION INACTIVE PERIODS USING LOW-POWER WAKE UP RECEIVER

FIELD

Aspects of the present disclosure generally relate to wireless communication. In some implementations, examples are described for Channel State Information (CSI) reporting during discontinuous reception (DRX) inactive times.

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one example, a first network entity for wireless communication is provided. The first network entity includes at least one memory and at least one processor coupled to the at least one memory. The at least one processor is configured to: receive, using a low-power (LP) wake-up receiver (LP-WUR) of the first network entity, a low-power signal indicative of configuration information for a channel state information (CSI) report of the first network entity; receive a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmit a CSI report corresponding to one or more measurements of the CSI-RS, wherein a transmission time of the CSI report is based on the configuration information indicated by the low-power signal.

In another illustrative example, a method for wireless communication is provided, the method including: receiving, using a low-power (LP) wake-up receiver (LP-WUR) of the first network entity, a low-power signal indicative of configuration information for a channel state information (CSI) report of the first network entity; receiving a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmitting a CSI report corresponding to one or more measurements of the CSI-RS, wherein a transmission time of the CSI report is based on the configuration information indicated by the low-power signal.

In another illustrative example, a non-transitory computer-readable storage medium comprising instructions stored thereon which, when executed by at least one processor, causes the at least one processor to: receive, using a low-power (LP) wake-up receiver (LP-WUR) of the first network entity, a low-power signal indicative of configuration information for a channel state information (CSI) report of the first network entity; receive a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmit a CSI report corresponding to one or more measurements of the CSI-RS, wherein a transmission time of the CSI report is based on the configuration information indicated by the low-power signal.

In another illustrative example, an apparatus is provided for wireless communication. The apparatus includes: means for receiving, using a low-power (LP) wake-up receiver (LP-WUR) of the first network entity, a low-power signal indicative of configuration information for a channel state information (CSI) report of the first network entity; means for receiving a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and means for transmitting a CSI report corresponding to one or more measurements of the CSI-RS, wherein a transmission time of the CSI report is based on the configuration information indicated by the low-power signal.

According to at least one example, a first network entity for wireless communication is provided. The first network entity includes at least one memory and at least one processor coupled to the at least one memory. The at least one processor is configured to: receive capability information corresponding to a low-power (LP) wake-up receiver (LP-WUR) of a second network entity; determine a configured receiver for a channel state information (CSI) report of the second network entity based on the capability information, wherein the configured receiver is determined as a selection between the LP-WUR of the second network entity or a main radio (MR) of the second network entity; transmit, to the LP-WUR of the second network entity, a low-power signal indicative of configuration information for the CSI report, the configuration information including an indication of the configured receiver; and receive the CSI report from the second network entity, wherein a transmission time of the CSI report is based on the configuration information indicated by the low-power signal.

In another illustrative example, a method for wireless communication is provided, the method including: receiving capability information corresponding to a low-power (LP) wake-up receiver (LP-WUR) of a second network entity; determining a configured receiver for a channel state information (CSI) report of the second network entity based on the capability information, wherein the configured receiver is determined as a selection between the LP-WUR of the second network entity or a main radio (MR) of the second network entity; transmitting, to the LP-WUR of the second network entity, a low-power signal indicative of configuration information for the CSI report, the configuration information including an indication of the configured receiver; and receiving the CSI report from the second network entity, wherein a transmission time of the CSI report is based on the configuration information indicated by the low-power signal.

In another illustrative example, a non-transitory computer-readable storage medium comprising instructions stored thereon which, when executed by at least one processor, causes the at least one processor to: receive capability information corresponding to a low-power (LP) wake-up receiver (LP-WUR) of a second network entity; determine a configured receiver for a channel state information (CSI) report of the second network entity based on the capability information, wherein the configured receiver is determined as a selection between the LP-WUR of the second network entity or a main radio (MR) of the second network entity; transmit, to the LP-WUR of the second network entity, a low-power signal indicative of configuration information for the CSI report, the configuration information including an indication of the configured receiver; and receive the CSI report from the second network entity, wherein a transmission time of the CSI report is based on the configuration information indicated by the low-power signal.

In another illustrative example, an apparatus is provided for wireless communication. The apparatus includes: means for receiving capability information corresponding to a low-power (LP) wake-up receiver (LP-WUR) of a second network entity; means for determining a configured receiver for a channel state information (CSI) report of the second network entity based on the capability information, wherein the configured receiver is determined as a selection between the LP-WUR of the second network entity or a main radio (MR) of the second network entity; means for transmitting, to the LP-WUR of the second network entity, a low-power signal indicative of configuration information for the CSI report, the configuration information including an indication of the configured receiver; and means for receiving the CSI report from the second network entity, wherein a transmission time of the CSI report is based on the configuration information indicated by the low-power signal.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
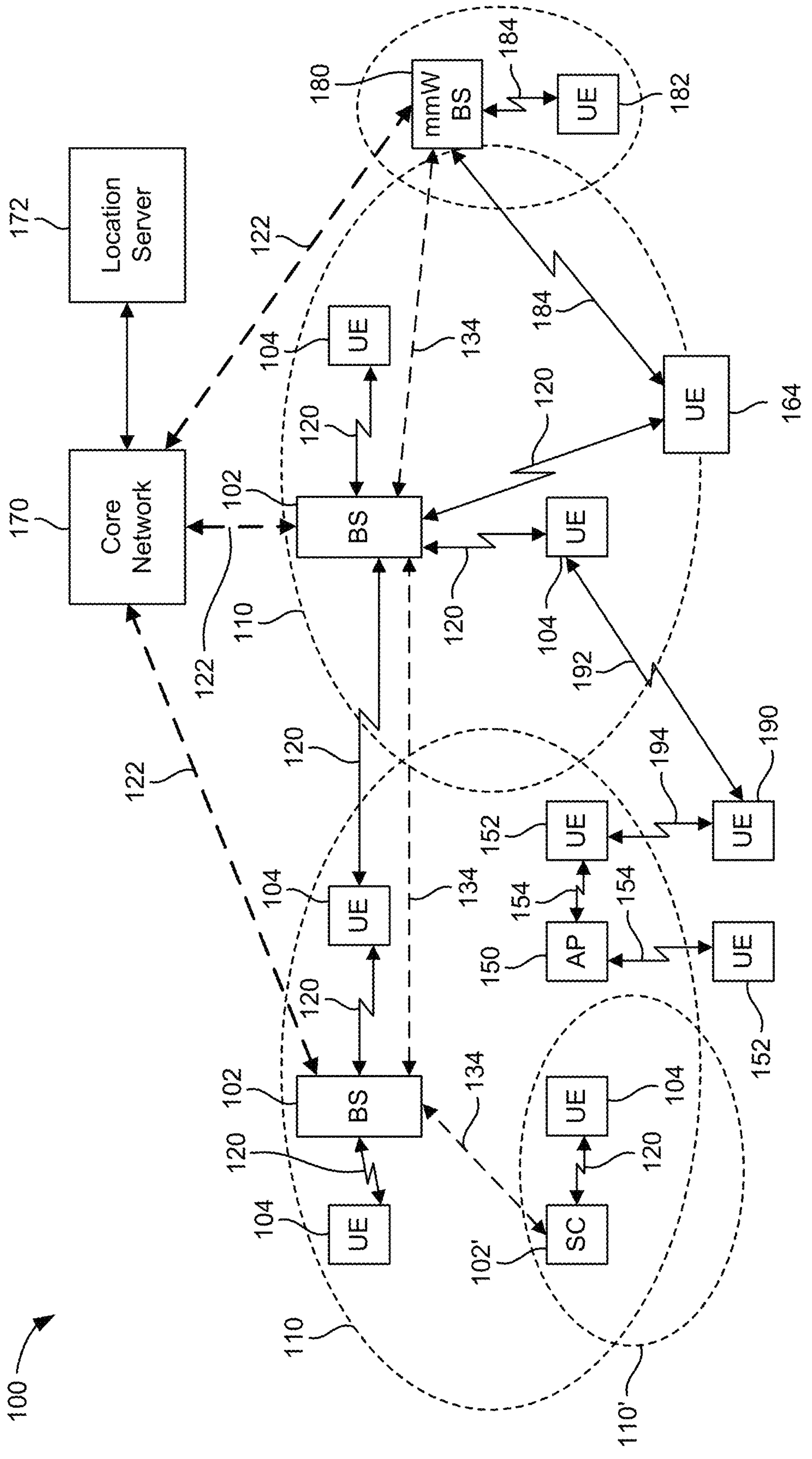
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

The energy efficiency of wireless communication between client devices (e.g., UEs, etc.) and base stations (e.g., gNBs, etc.) can vary based on various different factors. As used herein, the "energy efficiency" associated with wireless communications at a UE or base station may be referred to interchangeably as the "power consumption" associated with the wireless communications at the UE or base station.

Power consumption for wireless communications can include a power consumption associated with transmitting wireless signals and a power consumption associated with receiving wireless signals. For example, a UE power consumption can include the power consumption associated with the UE actively transmitting wireless signals (e.g., to a base station or gNB) and the power consumption associated with the UE actively receiving wireless signals (e.g., from a base station or gNB).

In addition to the power consumption associated with actively transmitting or receiving, a UE additionally consumes power while in an active or 'On' state where the UE is configured to be continuously ready to transmit or receive data. For instance, a UE consumes power while waiting to receive data from a base station or gNB, even when no data is being transmitted by the base station or gNB. The UE remains continuously awake in order to decode downlink data, as the data in the downlink may arrive at any time. The UE may monitor a physical downlink control channel (PDCCH) in every subframe to check whether a PDCCH is available scheduling or otherwise indicating downlink data for the UE. Continuously monitoring PDCCH for possible downlink (DL) and/or uplink (UL) data, the UE may consume a large portion of the available power at the UE (e.g., a large portion of the available battery power at the UE).

In some cases, power saving techniques can be implemented for client devices, for base stations, and/or for a combination of the two. Some power saving techniques are based on managing the energy efficiency or energy consumption of various periodic communications between UEs and base stations. For example, discontinuous reception (DRX) can be used to configure PDCCH periodic monitoring, where a UE wakes up to monitor for downlink data during a periodic DRX-enabled state and enters a low-power sleep or idle mode outside of the periodic DRX-enabled state (e.g., during a DRX-disabled state). Discontinuous transmission (DTX) can be used to configure periodic transmission of uplink signals by a UE (e.g., during a periodic DTX-enabled state), where the UE enters the low-power sleep or idle mode outside of the periodic DTX-enabled state (e.g., during a DTX-disabled state).

In some cases, DRX implemented by a UE can also be referred to as connected mode DRX, and may be used to improve UE battery power consumption based on the UE periodically entering a 'sleep' state for an 'off-duration' during which the UE does not monitor PDCCH. To monitor PDCCH for possible downlink/uplink data, the UE can be configured to wake up periodically and remain in an 'awake' state for an 'on-duration.' DRX implemented by a UE can also be referred to as "UE-DRX."

DRX implemented by a UE can include various types of DRX. For instance, one type of UE-DRX is Inactivity-based DRX (e.g., I-DRX). A UE implementing I-DRX may enter a low-power state when the UE is not actively engaged in data transmission or reception. For instance, an inactivity period can be defined or configured for I-DRX by the network. In I-DRX mode, a UE discontinuously receives data by periodically waking up to listen for a paging signal or other control information from the network. If there is nothing to receive (e.g., as indicated by a paging signal or other control information), the UE can return to the low-power state until the next scheduled wake-up time.

In some cases, a UE may generate and transmit one or more UL transmissions during a UE-DRX-on state (e.g., the on-duration of the UE-DRX cycle) and/or during a UE-DRX-off state (e.g., the off-duration of the UE-DRX cycle). For example, a UE may transmit periodic channel state information (CSI) or sounding reference signals (SRS) (e.g., among various other signals and/or transmissions).

In some examples, the network may configure the UE to receive CSI reference signals (CSI-RS) and/or to transmit a CSI report corresponding to the CSI-RS either within a DRX active time (e.g., DRX on-duration) or outside of the DRX active time. This type of configuration can be power consuming for the UE, as the CSI measurement and reporting configuration from the network may take priority over the UE implementation of DRX on- and off-durations. For instance, if the UE is configured to receive CSI-RS and/or to transmit a CSI report during a DRX active time, then the UE will remain awake for the entire DRX active time, even if there is no data traffic to the UE during the DRX active time. In such cases, the UE remains active for the DRX active time in order to receive the CSI-RS or transmit the CSI report, where the UE would otherwise have returned to the low-power mode (e.g., based on there being no data traffic for the UE during the DRX active time). There is a need for systems and techniques that can be used to implement a relaxed timeline for CSI-RS measurement, processing, and/or reporting at a UE. There is a further need for systems and techniques that can be used to signal and configure CSI-RS measurement, processing, and/or reporting at a UE to provide power savings and/or reduce power consumption inside and/or outside of a DRX active time (e.g., DRX on-duration).

Systems, apparatuses, processes (also referred to as methods), and computer-readable media (collectively referred to as "systems and techniques") are described herein that can be used to perform CSI measurement, processing, and/or reporting using a configured receiver of a UE and/or using a configured transmission timing for a CSI report. For instance, a UE can include a low-power wake-up receiver (LP-WUR) and a main radio (MR). The LP-WUR can be a companion receiver of the MR, and may be implemented in parallel with the MR. Currently, UEs may need to periodically wake up once per DRX cycle, an action which can dominate the UE power consumption in periods with no signaling or data traffic to the UE. The LP-WUR can be used to cause the UE to wake up only when the UE is triggered to do so by the network or a network entity. Using the LP-WUR to wake the UE (e.g., using the LP-WUR to wake the MR of the UE) can reduce paging and power consumption of the UE. For instance, a wake-up signal (WUS) can be used to cause the MR to wake up and/or exit a deep sleep state. The LP-WUR is a separate receiver from the MR, and can be configured with the ability to monitor for a WUS or other low-power signal, using a lesser power consumption than the MR.

In some aspects, the systems and techniques can be used to configure a UE for CSI-RS measurement and processing, and/or to configure a UE for a CSI report based on the CSI-RS, using signaling between a network entity (e.g., base station, gNB, etc.) and the LP-WUR of the UE. For instance, the LP-WUR of a UE can receive a low-power signal indicative of configuration information for a CSI report that is to be transmitted by the UE. In some examples, the low-power signal can be a low-power wake-up signal (LP-WUS) transmitted by a network entity (e.g., base station, gNB, etc.). The configuration information indicated by the LP-WUS can cause the LP-WUS to trigger the MR of the UE to exit the deep sleep state.

The configuration information can indicate whether the UE is to utilize the LP-WUR or the MR (e.g., once awakened from the deep sleep state) to perform CSI measurement. In some cases, the LP-WUS can indicate that the UE does not need to remain awake for an entire DRX active time (e.g., DRX on-duration) that is associated with or that includes one or more of the CSI-RS scheduled time and/or the CSI report scheduled time. The LP-WUS can configure the UE to receive CSI-RS and/or to transmit a corresponding CSI report outside of a DRX active time, inside of a DRX active time, etc. The LP-WUS can, in some cases, configure the UE to receive CSI-RS outside of or within a first DRX active time (e.g., a first DRX on-duration) and can configure the UE to generate and/or transmit the corresponding CSI report for the CSI-RS outside of or within a second DRX active time that is subsequent to the first DRX active time.

In some cases, the LP-WUS can be used to indicate to the UE (e.g., by or from the network entity, such as a base station, gNB, etc.) whether the UE must wake up to receive an upcoming CSI-RS. In some examples, if the LP-WUS does not indicate that the UE must wake up to receive the upcoming CSI-RS, the LP-WUS may be indicative of a cancellation of both receiving the CSI-RS and transmitting the corresponding CSI report for the CSI-RS. In some cases, the LP-WUS can include a CSI masking indication bit. For instance, a first value of the CSI masking indication bit can indicate that CSI masking should be enabled or performed by the UE, and a second value of the CSI masking indication bit can indicate that CSI masking should not be enabled or performed by the UE. CSI masking is a feature that can be used to limit a UE to uplink transmission of CSI reports only during the DRX on-duration.

In some aspects, the UE can be configured to transmit, to a network entity (e.g., base station, gNB, etc.) capability information corresponding to the LP-WUR of the UE. For instance, the capability information can be LP-WUR capability information, and may be indicative of one or more of a capability of the LP-WUR to receive the CSI-RS as the configured receiver of the UE; a capability of the LP-WUR to store the one or more measurements of the CSI-RS; and/or a capability of the LP-WUR to generate the corresponding CSI report for the CSI-RS, based on the LP-WUR having the capability to process the one or more measurements of the CSI-RS.

In some cases, the LP-WUS can include configuration information that causes the LP-WUR to wake the MR of the UE, where the MR receives the CSI-RS, processes the CSI-RS, and transmits the CSI report. In some examples, the LP-WUS can include configuration information that causes the LP-WUR to receive the CSI-RS and store one or more CSI-RS samples (e.g., CSI-RS in-phase/quadrature (I/Q) samples), where the LP-WUR wakes the MR of the UE to process the CSI-RS samples received and stored by the LP-WUR. The MR can additionally transmit the corresponding CSI report for the processed CSI-RS samples. In another example, the LP-WUS can include configuration information that causes the LP-WUR to receive the CSI-RS, store the one or more CSI-RS samples, and process the stored CSI-RS samples. The LP-WUR may wake the MR to transmit a CSI report generated by the LP-WUR and using CSI-RS samples that are received, measured, and stored by the LP-WUR.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHz), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
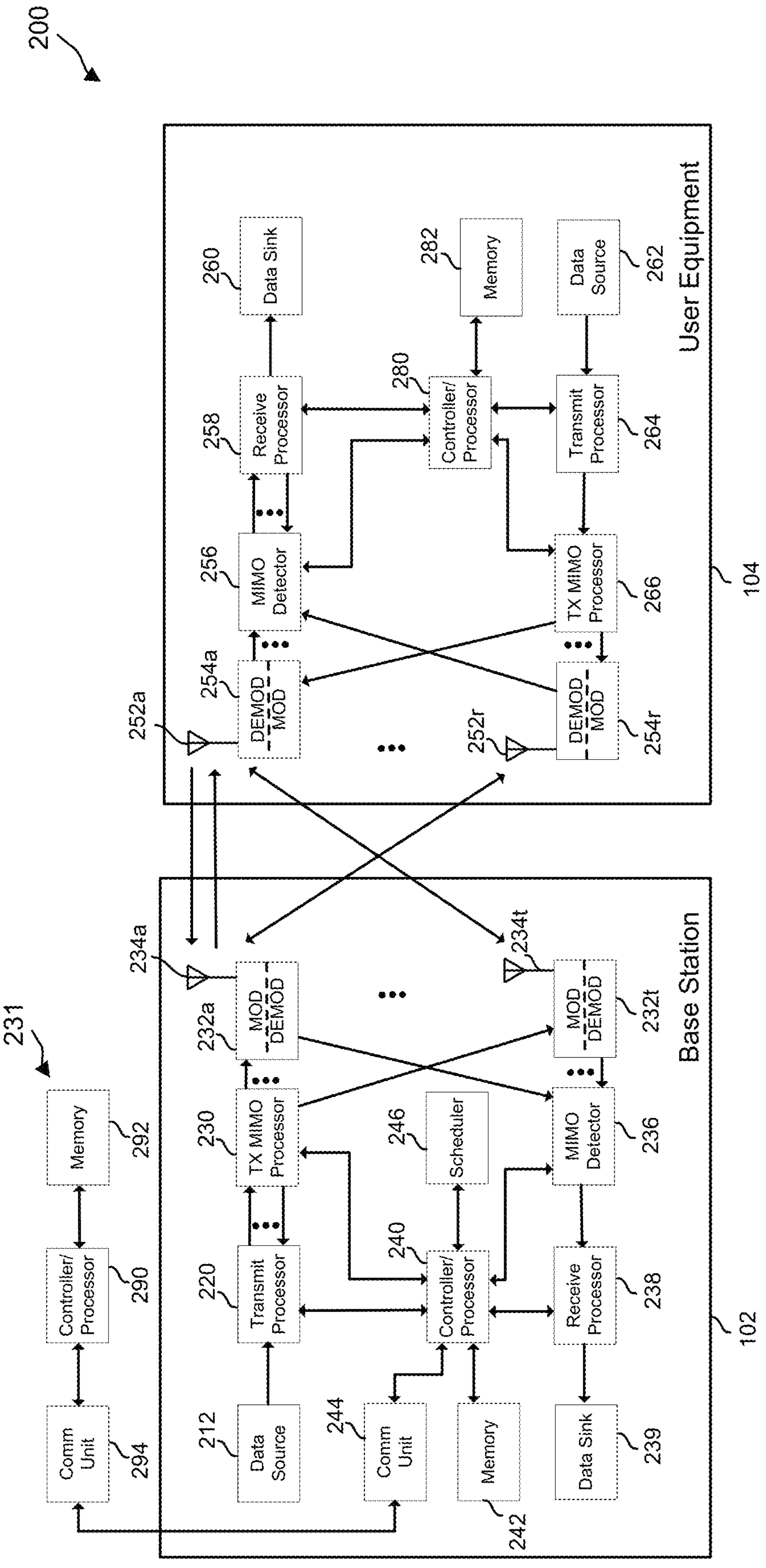
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234*a* through 234*t*, and UE 104 may be equipped with R antennas 252*a* through 252*r*, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. The modulators 232*a* through 232*t* are shown as a combined modulator-demodulator (MOD-DEMOD). In some cases, the modulators and demodulators can be separate components. Each modulator of the modulators 232*a* to 232*t* may process a respective output symbol stream (e.g., for an orthogonal frequency-division multiplexing (OFDM) scheme and/or the like) to obtain an output sample stream. Each modulator of the modulators 232*a* to 232*t* may further process (e.g., convert to analog, amplify, filter, and upconvert) the output sample stream to obtain a downlink signal. T downlink signals may be transmitted from modulators 232*a* to 232*t* via T antennas 234*a* through 234*t*, respectively. According to certain aspects described in more detail below, the synchronization signals can be generated with location encoding to convey additional information.

At UE 104, antennas 252*a* through 252*r* may receive the downlink signals from base station 102 and/or other base stations and may provide received signals to one or more demodulators (DEMODs) 254*a* through 254*r*, respectively. The demodulators 254*a* through 254*r* are shown as a combined modulator-demodulator (MOD-DEMOD). In some cases, the modulators and demodulators can be separate components. Each demodulator of the demodulators 254*a* through 254*r* may condition (e.g., filter, amplify, downconvert, and digitize) a received signal to obtain input samples. Each demodulator of the demodulators 254*a* through 254*r* may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254*a* through 254*r* (e.g., for DFT-s-OFDM, CP-OFDM, and/or the like), and transmitted to base station 102. At base station 102, the uplink signals from UE 104 and other UEs may be received by antennas 234*a* through 234*t*, processed by demodulators 232*a* through 232*t*, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
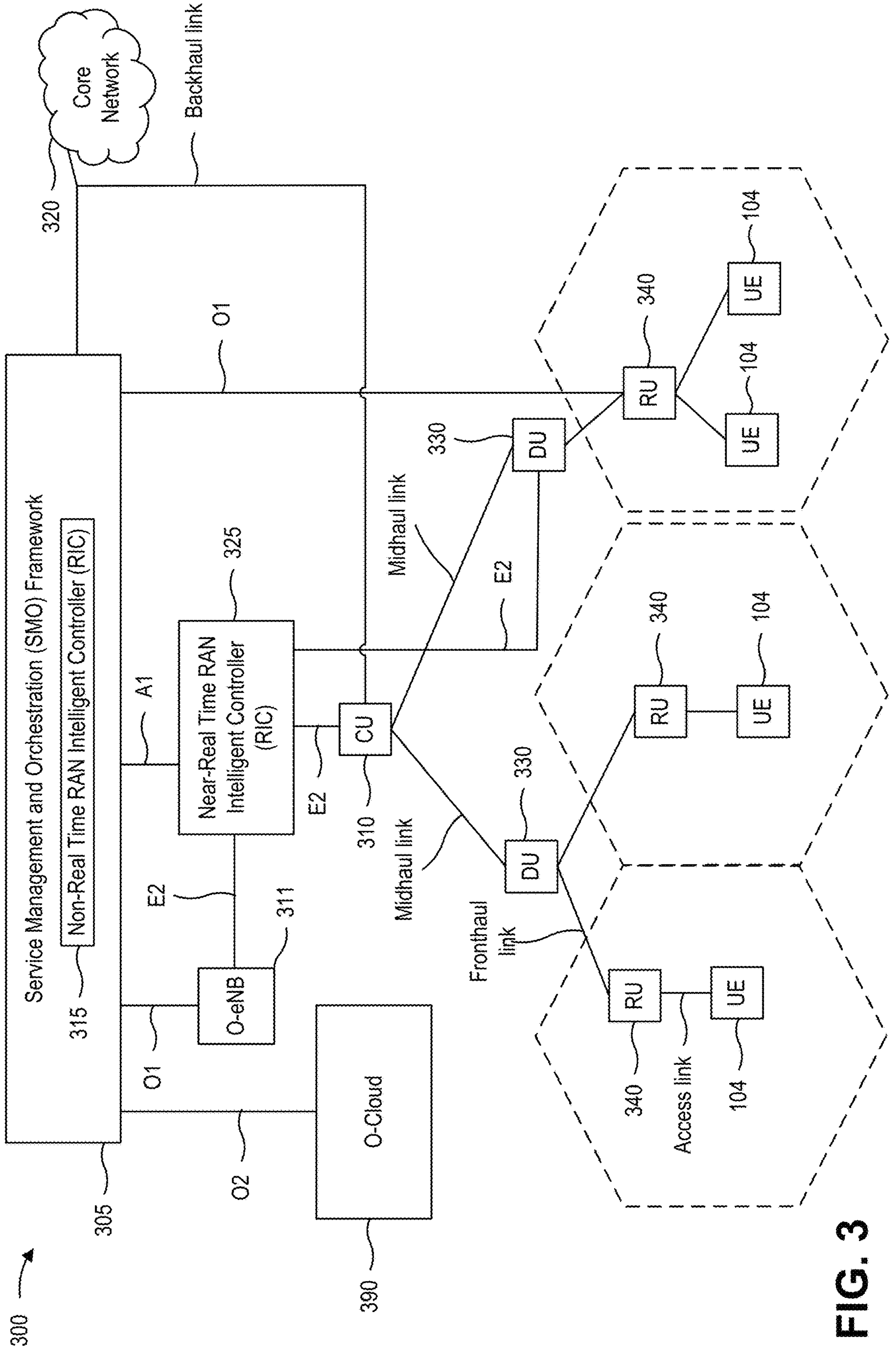
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUS 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
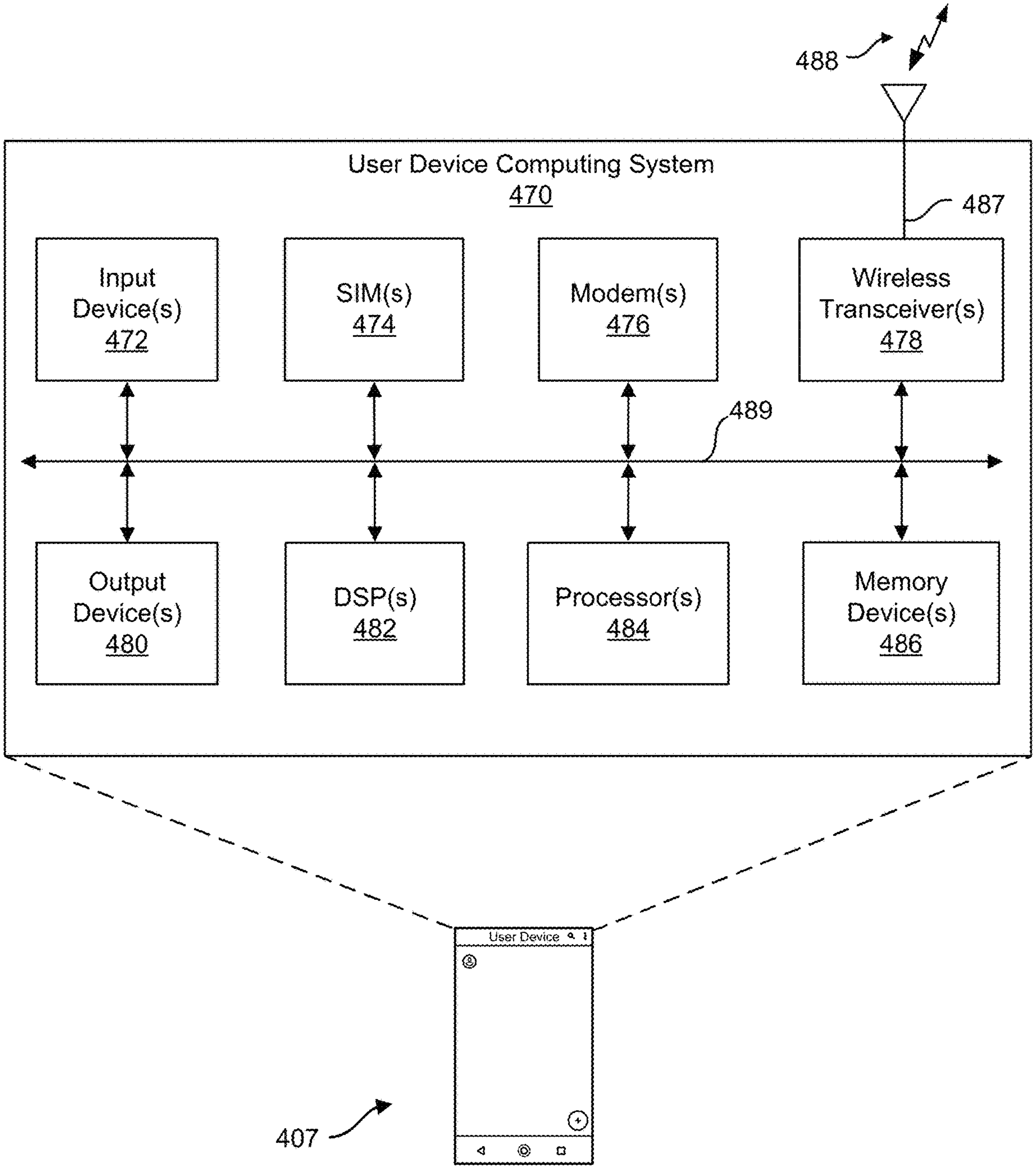
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAS, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

Figure 5:
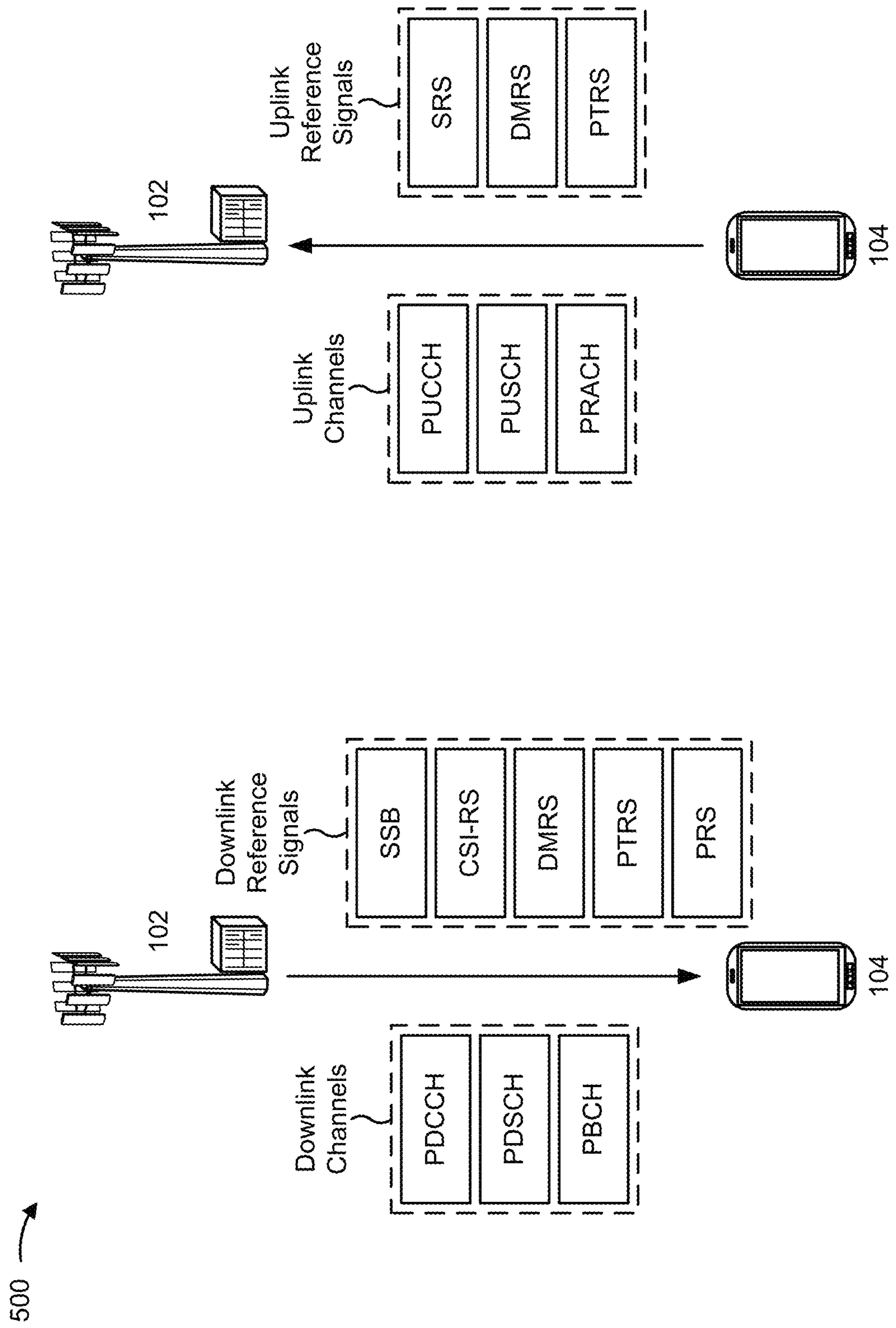
FIG. 5 is a diagram illustrating an example of physical channels and reference signals in a wireless network, in accordance with some examples.

FIG. 5 is a diagram illustrating an example 500 of physical channels and reference signals in a wireless network. In some examples, one or more downlink channels and one or more downlink reference signals may carry information from a base station 102 to a UE 104. One or more uplink channels and one or more uplink reference signals may carry information from UE 104 to base station 102.

In some aspects, a downlink channel may include one or more of a physical downlink control channel (PDCCH) that carries downlink control information (DCI), a physical downlink shared channel (PDSCH) that carries downlink data, and/or a physical broadcast channel (PBCH) that carries system information, among other examples. In some aspects, PDSCH communications may be scheduled by PDCCH communications.

In some examples, an uplink channel may include one or more of a physical uplink control channel (PUCCH) that carries uplink control information (UCI), a physical uplink shared channel (PUSCH) that carries uplink data, and/or a physical random access channel (PRACH) used for initial network access, among other examples. In some aspects, UE 104 may transmit acknowledgement (ACK) or negative acknowledgement (NACK) feedback (e.g., ACK/NACK feedback or ACK/NACK information) in UCI on the PUCCH and/or the PUSCH.

In some cases, a downlink reference signal may include one or more of a synchronization signal block (SSB), a channel state information (CSI) reference signal (CSI-RS), a demodulation reference signal (DMRS), a positioning reference signal (PRS), and/or a phase tracking reference signal (PTRS), among other examples. In some examples, an uplink reference signal may include one or more of a sounding reference signal (SRS), a DMRS, and/or a PTRS, among other examples.

An SSB may carry or include information used for initial network acquisition and synchronization. For example, an SSB can carry or include one or more of a primary synchronization signal (PSS), a secondary synchronization signal (SSS), a PBCH, and/or a PBCH DMRS. An SSB may also be referred to as a synchronization signal/PBCH (SS/PBCH) block. In some aspects, base station 102 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. For example, base station 102 can configure a set of CSI-RSs for UE 104, and UE 104 can measure the configured set of CSI-RSs. Based on the CSI-RS measurements, UE 104 can perform channel estimation and report channel estimation parameters to base station 102 (e.g., in a CSI report). For example, the channel estimation parameters can include one or more of a channel quality indicator (CQI), a precoding matrix indicator (PMI), a CSI-RS resource indicator (CRI), a layer indicator (LI), a rank indicator (RI), and/or a reference signal received power (RSRP), among other examples.

In some examples, base station 102 can use the CSI report to select transmission parameters for downlink communications to UE 104. For example, base station 102 can use the CSI report to select transmission parameters that include one or more of a quantity of transmission layers (e.g., a rank), a precoding matrix (e.g., a precoder), a modulation and coding scheme (MCS), and/or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS can carry information used to compensate for oscillator phase noise. In some cases, oscillator phase noise may increase as an oscillator carrier frequency increases. In some examples, a PTRS can be utilized at high carrier frequencies (e.g., such as millimeter wave frequencies) to mitigate oscillator phase noise. The PTRS may be used to track the phase of the local oscillator and to enable suppression of phase noise and common phase error (CPE). As illustrated in FIG. 5, in some examples one or more PTRSs can be used for both downlink communications (e.g., on the PDSCH) and uplink communications (e.g., on the PUSCH).

A PRS may carry information associated with timing or ranging measurements of UE 104. For example, UE 104 may utilize one or more signals (e.g., PRSs) transmitted by base station 102 to improve an observed time difference of arrival (OTDOA) positioning performance. In some examples, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). A PRS can be designed to improve detectability by UE 104, which may need to detect downlink signals from multiple neighboring base stations in order to perform OTDOA-based positioning. Accordingly, UE 104 may receive a PRS from multiple cells (e.g., a reference cell and one or more neighbor cells), and may report a reference signal time difference (RSTD) based on OTDOA measurements associated with the PRSs received from the multiple cells. In some aspects, base station 102 can calculate a position of UE 104 based on the RSTD measurements reported by UE 104.

In some examples, an SRS can carry information used for uplink channel estimation, which may be used for scheduling, link adaptation, precoder selection, and/or beam management, among other examples. Base station 102 can configure one or more SRS resource sets for UE 104, and UE 104 can transmit SRSs on the configured SRS resource sets. An SRS resource set may have a configured usage, such as uplink CSI acquisition, downlink CSI acquisition for reciprocity-based operations, uplink beam management, among other examples. Base station 102 may measure the SRSs, may perform channel estimation based on the measurements, and/or may use the SRS measurements to configure communications with UE 104.

As mentioned previously, the systems and techniques described herein can be used to provide improved energy efficiency for wireless communications between UEs and base stations. In some aspects, the systems and techniques can be used to configure a UE for CSI-RS measurement and processing, and/or to configure a UE for a CSI report based on the CSI-RS, using signaling between a network entity (e.g., base station, gNB, etc.) and a low-power wake-up receiver (LP-WUR) of the UE. In one illustrative example, a low-power wake-up signal (LP-WUS) can be indicative of configuration information corresponding to using the LP-WUR of the UE to perform CSI measurement and reporting, and/or can be indicative of configuration information corresponding to using the MR of the UE to perform CSI measurement and reporting.

Figure 6A:
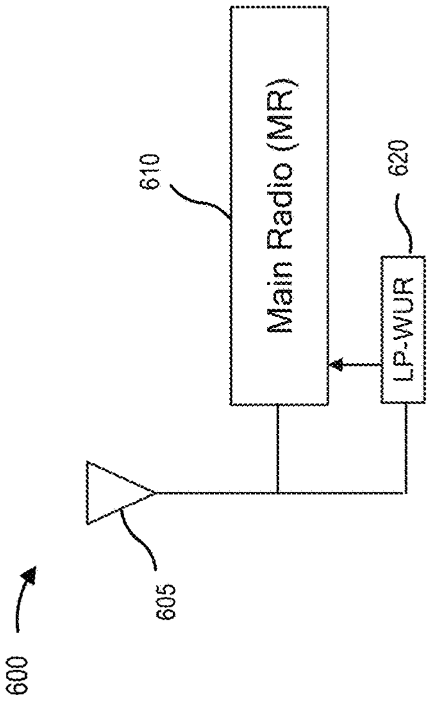
FIG. 6A is a diagram illustrating an example of a communication system or device including a main radio (MR) and a low-power wake-up receiver (LP-WUR), in accordance with some examples.

FIG. 6A is a diagram illustrating an example of a communication system 600 (e.g., wireless communication device, such as a UE) including a main radio (MR) and a low-power wake-up receiver (LP-WUR) associated with the MR, in accordance with some examples. In addition to latency, reliability, and availability, UE energy efficiency is an important factor for the design of wireless communication systems and standards, including 5G NR and beyond. Energy efficiency can be an important consideration for UEs without a continuous energy source (e.g., UEs using small rechargeable batteries, single coin cell batteries, etc.). Some UEs may be implemented as IoT UEs, such as connected sensors or actuators, and may be deployed with non-rechargeable batteries and used for purposes such as monitoring, measuring, etc. Wearables devices can include wearable UEs, such as smart watches, rings, health-related devices, medical monitoring devices, etc., and may struggle to sustain a battery life of one to two weeks as is required.

In some examples, a UE (e.g., wireless communication device 600) can include a low-power wake-up receiver (LP-WUR) 620 and a main radio (MR) 610. The LP-WUR 620 can be a companion receiver of the MR 610, and may be implemented in parallel with the MR 610. For instance, the LP-WUR 620 and the MR 610 may share antenna 605 of the UE 600. The power consumption of a UE can be based on the configured length of wake-up periods (e.g., paging cycle). Currently, UEs may need to periodically wake up once per discontinuous reception (DRX) cycle, an action which can dominate the UE power consumption in periods with no signaling or data traffic to the UE. The LP-WUR 620 can be used to cause the UE to wake up only when the UE is triggered to do so by the network or a network entity. Using the LP-WUR 620 to wake the UE 600 (e.g., using the LP-WUR 620 to wake the MR 610 of the UE 600) can reduce paging and power consumption of the UE 600. For instance, a wake-up signal (WUS) can be used to cause the MR 610 to wake up and/or exit a deep sleep state. The LP-WUR 620 is a separate receiver from the MR 610, and can be configured with the ability to monitor for a WUS or other low-power signal, using a lesser power consumption than the MR 610.

In some case, the LP-WUR 620 may be configured to perform continuous monitoring for a LP-WUS. In some examples, the LP-WUR 620 can be configured to perform discontinuous monitoring for a LP-WUS, for instance with T milliseconds (ms) as the period to complete an on-and-off discontinuous LP-WUS monitoring cycle by the LP-WUR 620, and D ms as the active time for monitoring LP-WUS every cycle.

Figure 6B:
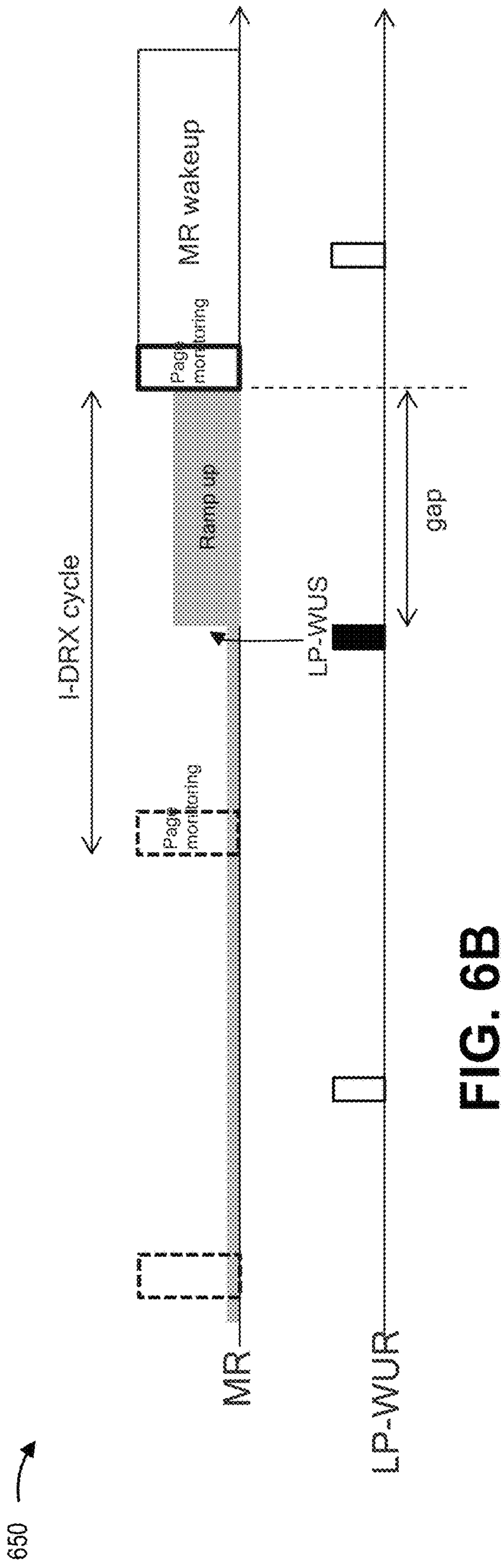
FIG. 6B is a diagram illustrating an example of wireless communications performed using the MR and LP-WUR of FIG. 6A, in accordance with some examples.

FIG. 6B is a diagram illustrating an example of wireless communications 650 performed using the MR 610 and LP-WUR 620 of FIG. 6A, in accordance with some examples. A communications timeline is shown corresponding to the MR 610 of FIG. 6A in the upper portion of FIG. 6B, and a communications timeline is shown corresponding to the LP-WUR 620 of FIG. 6A in the lower portion of FIG. 6B. In some examples, the MR can be associated with a plurality of page monitoring occasions, which corresponding to a configured length of wake-up periods for receiving and/or transmitting control information and/or data by the MR of the UE. In some cases, a page monitoring occasion can correspond to a wake-up period or paging cycle of the UE and the MR. For instance, each page monitoring occasion can correspond to an I-DRX cycle.

The LP-WUR can be implemented as a companion receiver off the MR, and can be configured to process low-power wake-up signals (LP-WUSs) transmitted by a network entity (e.g., base station, gNB, etc.). In some cases, the LP-WUR can additionally process one or more control signals from the network entity. In some examples, the use of the LP-WUR can allow the MR to skip one or more page monitoring occasions, and remain in a deep sleep state (e.g., an ultra-deep sleep state) during the one or more skipped page monitoring occasions. During a page monitoring occasion skipped by the MR, the LP-WUR can monitor for a LP-WUS on a LP-WUS monitoring occasion that corresponds to at least one of the skipped page monitoring occasions of the MR. For example, the LP-WUR can monitor for a LP-WUS on a LP-WUS monitoring occasion that is between the first and second skipped page monitoring occasions of the MR, as shown in the timelines of FIG. 6B.

Based on not receiving a LP-WUS during the LP-WUS monitoring occasion, the LP-WUR may take no action, and can allow the MR to remain in ultra-deep sleep state. In the second LP-WUS monitoring occasion shown in FIG. 6B for the LP-WUR timeline, the LP-WUR receives an LP-WUS from the network entity (e.g., gNB, base station, etc.). The network entity may transmit the LP-WUS to be indicative of traffic arriving at the gNB for the UE (e.g., traffic arriving at the gNB needing the MR of the UE for receiving). Based on receiving the LP-WUS in the second LP-WUS monitoring occasion, the LP-WUR can trigger the MR to exit the deep sleep state. For instance, the LP-WUR can transmit a wake-up signal (WUS) to the MR, based on the LP-WUR receiving the LP-WUS from the network entity.

The MR can begin exiting the deep sleep state and transitioning to an active (e.g., on or awake) state, with a corresponding transition or ramp up time between the MR receiving the trigger to exit the deep sleep state and the MR reaching the awake state where the MR is ready to receive data traffic from the network entity. For instance, the ramp up period of the MR wakeup can be associated with a time delay or time gap relative to the receipt of the LP-WUS at the LP-WUR, as shown in FIG. 6B. In some cases, the LP-WUS can be configured with transmission timing such that the LP-WUR triggers the MR to wake up sufficiently early relative to the next page monitoring occasion (e.g., next I-DRX cycle). Based on completing the ramp up and entering the awake state by the beginning of the next page monitoring occasion for the next I-DRX cycle, the MR of the UE is able to receive the transmitted data from the network entity at high speed during the MR wakeup period corresponding to the received LP-WUS.

Figure 7:
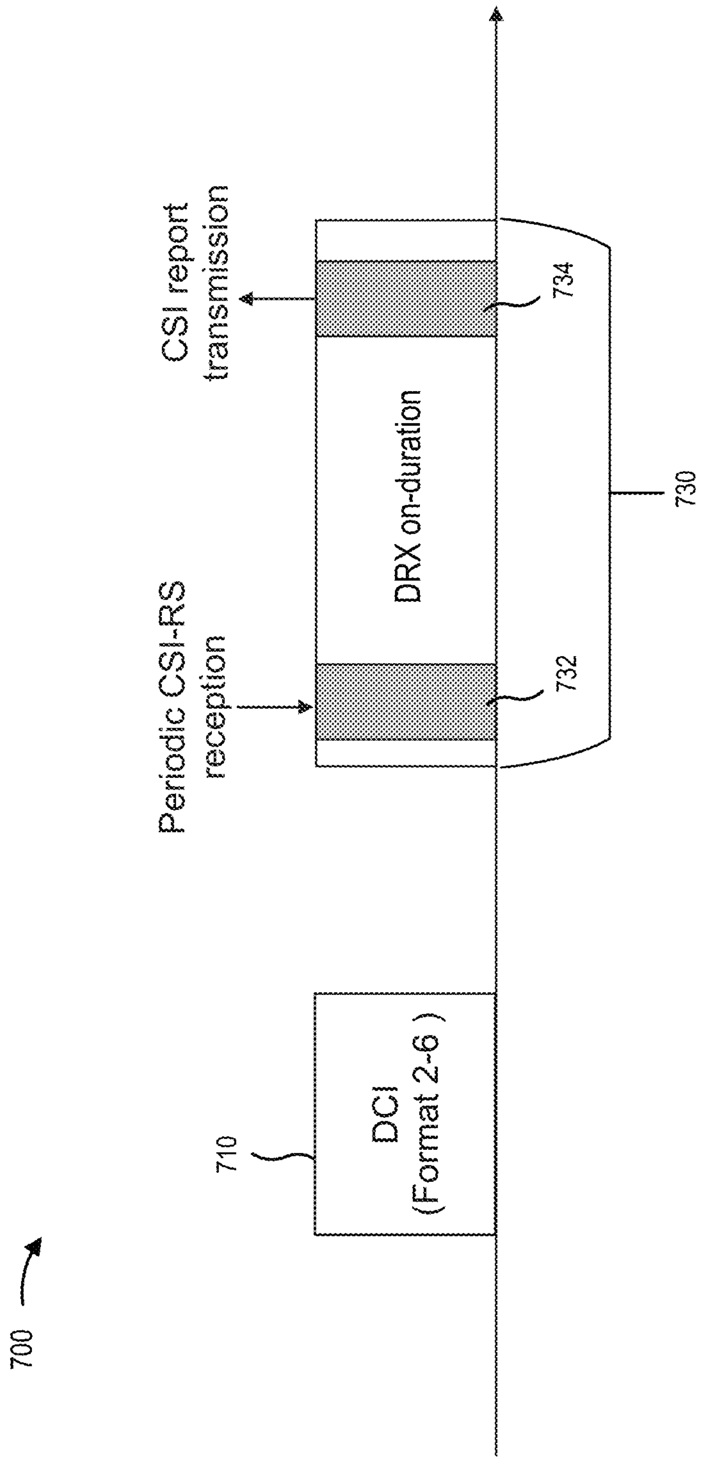
FIG. 7 is a diagram illustrating an example of periodic channel state information (CSI) transmission and reception during a discontinuous reception (DRX) active time based on downlink control information (DCI), in accordance with some examples.

FIG. 7 is a diagram illustrating an example of periodic channel state information (CSI) transmission and reception 700 during a discontinuous reception (DRX) active time based on downlink control information (DCI), in accordance with some examples. A UE may be configured to receive CSI-RS and/or to transmit a corresponding CSI report for the CSI-RS by a network entity (e.g., gNB, base station, etc.). In some cases, the UE can be configured to perform periodic CSI reception.

The periodic CSI reception configuration may correspond to a periodic CSI-RS reception 732 that falls within a DRX on-duration 730 that is separately configured for the UE. The periodic CSI reception configuration may also correspond to a CSI report transmission 734 that falls within the DRX on-duration 730. The periodic CSI-RS reception 732 and the CSI report transmission 734 can be within the same DRX on-duration 730, or can be in separate (e.g., different or subsequent) cycles of the DRX on-duration 730.

In some examples, a wake-up signal (WUS) corresponding to the periodic CSI reporting configuration can be implemented based on a downlink control information (DCI) 710. For instance, the periodic CSI WUS can be implemented using a DCI format 2-6 transmission 710, where the DCI format 2-6 transmission 710 is indicative of whether the UE should skip the upcoming DRX on-duration 730 or should not skip the upcoming DRX on-duration 730. In some cases, the DCI format 2-6 WUS 710 is used during connected-mode DRX. In some examples, the DCI format 2-6 WUS 710 is a physical downlink control channel (PDCCH)-based WUS.

Without the DCI format 2-6 WUS 710, the MR of the UE may wake up and continuously monitor physical downlink control channel (PDCCH) for the entire DRX on-duration 730, even if no periodic CSI-RS reception 732 or CSI report transmission 734 is scheduled. This can be power consuming for the UE.

It can also be power consuming for the UE if the DCI Format 2-6 WUS 710 is used to indicate that the UE should not skip the upcoming DRX on-duration 730, in instances where the UE would otherwise have skipped the upcoming DRX on-duration 730 and remained in the MR deep sleep state if the DCI format 2-6 WUS 710 was not received. For instance, the DCI format 2-6 WUS 710 may be transmitted to the UE to cause the UE to keep the MR awake during the DRX on-duration 730 in order to receive the periodic CSI-RS reception 732 and/or to transmit the CSI report transmission 734. Power consumption of the MR may be wasted for the portion of the DRX on-duration 730 where the MR remains awake (e.g., based on the signaled indication of the DCI format 2-6 WUS 710), but is neither receiving the periodic CSI-RS reception 732 nor transmitting the CSI report transmission 734.

In other cases, the UE may consume excess power in examples where the network configures a periodic CSI-RS transmission and reporting mechanism for the UE (e.g., when the network configures the periodic CSI-RS reception 732 and CSI report transmission 734). In such examples, the MR of the UE may be required to wake up and remain awake for the entirety of the DRX on-duration 730, irrespective of whether the DCI format 2-6 WUS 710 indicates that the UE should skip the DRX on-duration 730 (e.g., no data traffic scheduled for the UE during the DRX on-duration 730).

As noted above, the systems and techniques provided herein can be used to configure a UE for CSI-RS measurement and reporting with improved power efficiency (e.g., reduced power consumption), using signaling between a network entity (e.g., base station, gNB, etc.) and the LP-WUR of the UE. For instance, the LP-WUR of a UE can receive a low-power signal indicative of configuration information for a CSI report that is to be transmitted by the UE. In some examples, the low-power signal can be a low-power wake-up signal (LP-WUS) transmitted by a network entity (e.g., base station, gNB, etc.). The configuration information indicated by the LP-WUS can cause the LP-WUS to trigger the MR of the UE to exit the deep sleep state.

Figure 8:
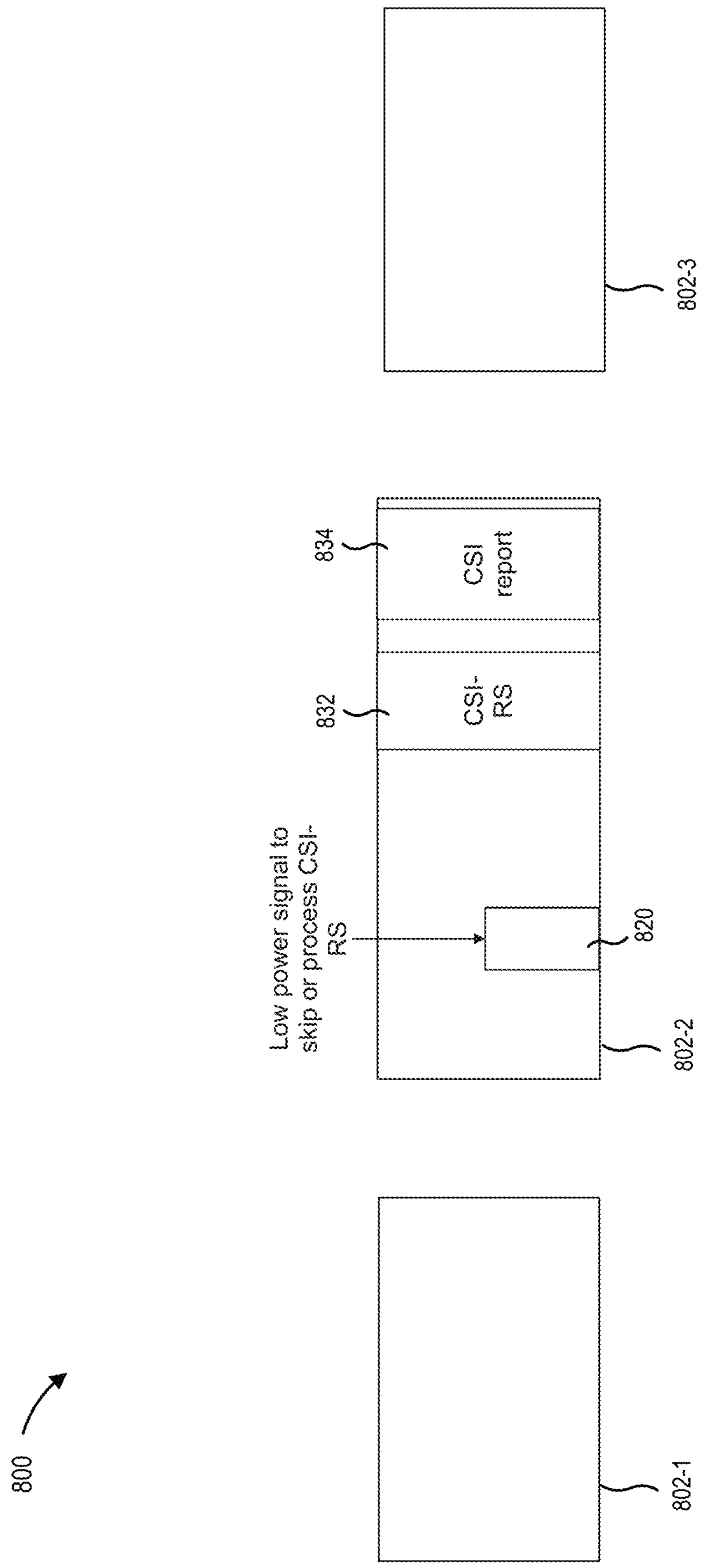
FIG. 8 is a diagram illustrating an example of CSI reference signal (CSI-RS) reception and reporting based on a low power signal indicative of a configuration to skip or process CSI-RS, in accordance with some examples.

For example, FIG. 8 is a diagram illustrating an example of CSI reference signal (CSI-RS) reception and reporting 800 based on a low power signal indicative of a configuration to skip or process CSI-RS, in accordance with some examples. A UE can receive a low-power signal 820 to skip or process an upcoming CSI-RS occasion (e.g., CSI-RS 832) and/or to skip or transmit an upcoming CSI report occasion (e.g., CSI report 834).

In some aspects, the low-power signal 820 can be a low-power wake-up signal (LP-WUS) transmitted by a network entity (e.g., base station, gNB, etc.) and received by a LP-WUR of a UE (e.g., such as LP-WUR 620 of FIG. 6). In some cases, the CIS-RS 832 of FIG. 8 can be the same as or similar to the periodic CSI-RS reception 732 of FIG. 7. In some examples, the CSI report 834 of FIG. 8 can be the same as or similar to the CSI report transmission 734 of FIG. 7. The low-power signal 820 to skip or process CSI-RS may be received within or corresponding to a respective DRX on-duration 802-2 of a plurality of DRX on-durations (e.g., DRX cycles) configured for the UE. For instance, the DRX on-duration 802-1 can be the DRX on-duration of an immediately previous DRX cycle of the UE, and the DRX on-duration 802-3 can be the DRX on-duration of an immediately subsequent DRX cycle of the UE.

In some examples, the low-power signal (e.g., LP-WUS) 820 can include configuration information indicating whether the UE has to wake up to receive the CSI-RS 832. In some aspects, the LP-WUS 820 indicating that the UE must wake up to receive the CSI-RS 832 can be an implicit indication that the UE must wake up (or remain awake) to transmit the corresponding CSI report 834 for the in-phase/quadrature (I/Q) samples or measurements determined by the UE for the CSI-RS 832 reception. In some cases, the LP-WUS 820 can indicate that the upcoming or scheduled CSI occasion (e.g., CSI-RS 832 and/or CSI report 834) may be skipped, and the MR of the UE can remain in a deep sleep state. In some examples, the LP-WUS 820 can indicate that the upcoming or scheduled CSI occasion (e.g., CSI-RS 832 and/or CSI report 834) is cancelled for the UE.

The configuration information can indicate whether the UE is to utilize the LP-WUR or the MR (e.g., once awakened from the deep sleep state) to perform CSI measurement. In some cases, the LP-WUS can indicate that the UE does not need to remain awake for an entire DRX active time (e.g., DRX on-duration) that is associated with or that includes one or more of the CSI-RS scheduled time and/or the CSI report scheduled time. The LP-WUS can configure the UE to receive CSI-RS and/or to transmit a corresponding CSI report outside of a DRX active time, inside of a DRX active time, etc. The LP-WUS can, in some cases, configure the UE to receive CSI-RS outside of or within a first DRX active time (e.g., a first DRX on-duration) and can configure the UE to generate and/or transmit the corresponding CSI report for the CSI-RS outside of or within a second DRX active time that is subsequent to the first DRX active time.

In some aspects, the LP-WUS 820 can include a CSI masking indication bit to enable or disable CSI masking for the UE. CSI masking is a 3GPP feature that when enabled, can be used to limit a UE to transmitting a CSI report (e.g., CSI report 834) only within a DRX on-duration (e.g., DRX on-duration 802-2). The CSI masking indication bit can be included in the CSI measurement and reporting configuration information (e.g., referred to herein as "CSI configuration information" or "configuration information") indicated by the LP-WUS 820. In some cases, the CSI masking indication bit can be carried by the LP-WUS 820 separately from the CSI configuration information.

In some examples, a UE may be configured to conditionally cancel CSI reception (e.g., reception of CSI-RS 832), to conditionally cancel CSI processing (e.g., processing of CSI I/Q samples measured for CSI-RS 832), and/or to conditionally cancel CSI reporting (e.g., transmission of CSI report 834 generated based on the reception, measurement, and processing of CSI-RS 832). For instance, a UE may be configured to conditionally cancel upcoming CSI measurement and reporting based on a determination that the UE has no uplink (UL) data scheduled for transmission within an overlapping time window that would include the upcoming scheduled CSI measurement for CSI-RS 832 or the upcoming scheduled CSI report 834 transmission. For instance, the UE may conditionally cancel CSI measurement of CSI-RS 832 and reporting of CSI report 834 for the DRX on-duration 802-2, based on a determination that the UE has no UL data scheduled for transmission within the overlapping DRX on-duration 802-2. In some aspects, the UE may conditionally cancel CSI measurement and reporting based on a determination that the UE has no UL of particular logical channels (LCHs) and/or logical channel groups (LCGs).

In some examples, if the UE does not conditionally cancel, the UE may be configured to receive the CSI-RS 832 and/or to transmit the CSI report 834 (e.g., within the DRX on-duration 802-2), as the UE not conditionally canceling can corresponding to the UE in all cases transmitting scheduling requests (SRs) (e.g., when the UE has data to transmit but no currently allocated uplink resources) or transmitting UL data (e.g., when the UE does have currently allocated uplink resources).

For instance, the determination of UL data and/or one or more SRs at the UE for transmission within the current DRX on-duration 802-2 can cause the UE to receive CSI-RS 832 and transmit CSI report 834 within DRX on-duration 802-2, despite the LP-WUS 820 being indicative of a cancellation for the CSI measurement and reporting for the UE for the current DRX on-duration 802-2.

Figure 9:
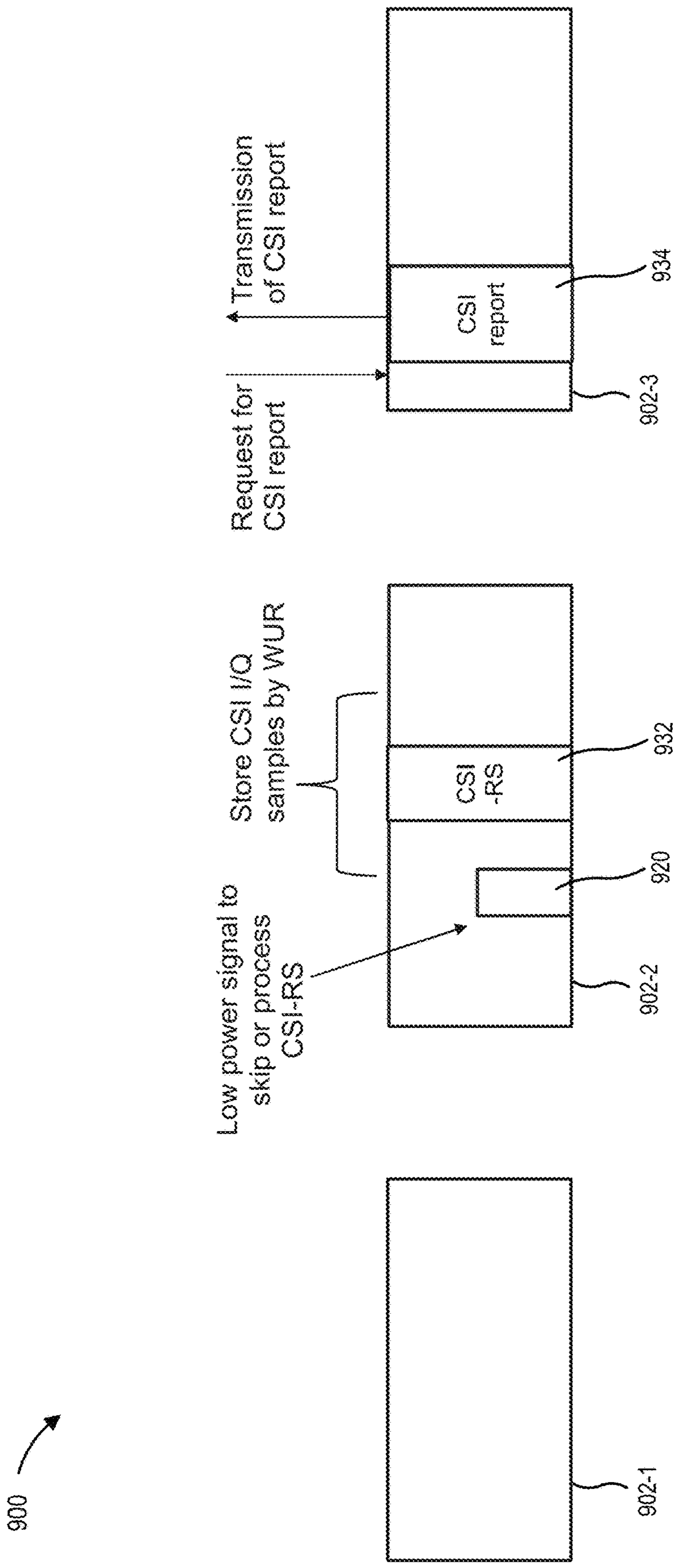
FIG. 9 is a diagram illustrating an example of CSI-RS reception, storage, and reporting based on a low power signal indicative of a configuration to skip or process CSI-RS, in accordance with some examples.

FIG. 9 is a diagram illustrating an example of CSI-RS reception, storage, and reporting 900 based on a low power signal 920 indicative of a configuration to skip or process CSI-RS, in accordance with some examples. In some cases, a first DRX cycle on-duration 902-1 can be the same as or similar to the first DRX cycle on-duration 802-1 of FIG. 8. A second (e.g., current) DRX cycle on-duration 902-2 of FIG. 9 can be the same as or similar to the second (e.g., current) DRX on-cycle duration 802-2 of FIG. 8. A third DRX cycle on-duration 902-3 of FIG. 9 can be the same as or similar to the third DRX cycle on-duration 802-3 of FIG. 8.

In some cases, the low-power signal 920 of FIG. 9 can be a low-power wake-up signal (LP-WUS). For instance, the low-power signal 920 of FIG. 9 can be an LP-WUS 920 that is the same as or similar to the LP-WUS 820 of FIG. 8.

The current DRX cycle on-duration 902-2 can include a scheduled CSI-RS reception and/or measurement occasion 932, which may be the same as or similar to the CSI-RS occasion 832 of FIG. 8. The next (e.g., third) DRX cycle on-duration 902-3 can include a CSI report 934 that is the same as or similar to the CSI report 834 of FIG. 8. The CSI report 934 can correspond to the reception, measurement, and/or processing of one or more CSI I/Q samples for the CSI-RS 932.

In one illustrative example, the UE can transmit capability information corresponding to the LP-WUR included in the UE. For instance, the UE can transmit LP-WUR capability information to the network entity (e.g., base station, gNB, etc.). The LP-WUR capability information can be indicative of a capability of the LP-WUR to receive the CSI-RS as the configured receiver of the first network entity. In some cases, the LP-WUR capability information can be indicative of a capability of the LP-WUR to store the one or more measurements of the CSI-RS. In some examples, the LP-WUR capability information can be indicative of a capability of the LP-WUR to generate the CSI report based on processing the one or more measurements of the CSI-RS.

In some cases, the network entity can generate the LP-WUS 920 based on the UE LP-WUR capability information. For instance, the network entity can generate the LP-WUS 920 to be indicative of CSI configuration information determined based on the UE LP-WUR capability information. In one illustrative example, the UE LP-WUR capability information can be used to determine whether the UE LP-WUR or the UE MR is to be used to perform one or more (or all) of receiving and measuring the CSI-RS 932, storing the CSI-RS 932 I/Q samples, processing the measured and/or stored CSI-RS 932 I/Q samples, generating the CSI report 934 based on the processed CSI-RS 932 I/Q samples, and/or transmitting the CSI report 934 generated based on the processed CSI-RS 932 I/Q samples. For instance, the use of the UE LP-WUR or the UE MR to perform CSI measurement and reporting tasks can be determined based on the UE LP-WUR capability information and can be indicated to the UE (e.g., by the network entity) using the LP-WUS 920 and/or the CSI configuration thereof.

The configuration information can indicate whether the UE is to utilize the LP-WUR or the MR (e.g., once awakened from the deep sleep state) to perform CSI measurement for the CSI-RS 932. In some cases, the LP-WUS 920 can indicate that the UE does not need to remain awake for an entire DRX active time (e.g., DRX on-duration 902-2) that is associated with or that includes one or more of the CSI-RS 932 scheduled time and/or the CSI report 934 scheduled time. The LP-WUS 920 can configure the UE to receive CSI-RS 932 and/or to transmit a corresponding CSI report 932 outside of a DRX active time 902-2, inside of a DRX active time 902-2, etc. The LP-WUS 920 can, in some cases, configure the UE to receive CSI-RS 932 outside of or within a current DRX active time (e.g., current DRX on-duration 902-2) and can configure the UE to generate and/or transmit the corresponding CSI report 934 for the CSI-RS 932 outside of or within a second DRX active time (e.g., DRX on-duration 902-3) that is subsequent to the current DRX active time (e.g., DRX on-duration 902-2). In some aspects, the CSI report 934 can be delayed relative to the measurement and/or processing of the CSI-RS 932 within the current DRX on-duration 902-2. For instance, the CSI report 934 may be generated and/or transmitted in response to receiving a request for the CSI report from the network entity. The request can be received in a subsequent DRX cycle on-duration, such as the third DRX cycle on-duration 902-3 of FIG. 9. Receiving the request for the CSI report 934, and transmitting the CSI report 934, can correspond to a time delay value from the measurement of CSI-RS 932 and the storage of the corresponding CSI-RS I/Q samples measured for the CSI-RS 932.

In some cases, the LP-WUS 920 can be used to indicate to the UE (e.g., by or from the network entity, such as a base station, gNB, etc.) whether the UE must wake up to receive an upcoming CSI-RS 932. In some examples, if the LP-WUS 920 does not indicate that the UE must wake up to receive the upcoming CSI-RS 932, the LP-WUS 920 may be indicative of a cancellation of both receiving the CSI-RS 932 and transmitting the corresponding CSI report 934 for the CSI-RS 932. In some cases, the LP-WUS 920 can include a CSI masking indication bit. For instance, a first value of the CSI masking indication bit can indicate that CSI masking should be enabled or performed by the UE, and a second value of the CSI masking indication bit can indicate that CSI masking should not be enabled or performed by the UE. CSI masking is a feature that can be used to limit a UE to uplink transmission of CSI reports 934 only during a DRX on-duration (e.g., 902-1, 902-2, 902-3, etc.).

In some cases, the LP-WUS 920 can include configuration information that causes the LP-WUR to wake the MR of the UE, where the MR receives the CSI-RS 932, processes the CSI-RS 932, and transmits the CSI report 934. In some examples, the LP-WUS 920 can include configuration information that causes the LP-WUR to receive the CSI-RS 932 and store one or more CSI-RS 932 samples (e.g., CSI-RS in-phase/quadrature (I/Q) samples), where the LP-WUR wakes the MR of the UE to process the CSI-RS 932 samples received and stored by the LP-WUR. The MR can additionally transmit the corresponding CSI report 934 for the processed CSI-RS 932 samples. In another example, the LP-WUS 920 can include configuration information that causes the LP-WUR to receive the CSI-RS 932, store the one or more CSI-RS 932 samples, and process the stored CSI-RS 932 samples. The LP-WUR may wake the MR to transmit a CSI report 934 generated by the LP-WUR and using CSI-RS 932 samples that are received, measured, and stored by the LP-WUR.

In some aspects, the LP-WUS 920 can include configuration information that causes the UE to delay transmission of the CSI report 934 until the UE MR wakes up (e.g., fully exits the deep sleep state that the MR was in at the time the LP-WUS 920 was received by the LP-WUR of the UE). In some cases, the configuration information can correspond to a time delay value corresponding to a ramp time of wake-up time for the UE MR to exit the deep sleep state and enter the active, on, awake, etc., state for receiving CSI-RS 932 and/or transmitting CSI report 934. In some examples, the configuration information can correspond to a time delay value corresponding to a processing time of the UE MR, in examples where the UE MR is used to measure the CSI-RS 932 and generate the CSI report 934. In some cases, the configuration information can correspond to a time delay value corresponding to a processing time of the LP-WUR, in examples where the LP-WUR is used to measure the CSI-RS 932 and generate the CSI report 934.

In some aspects, the LP-WUS can include configuration information that indicates the time delay value directly for transmitting the CSI report 934. For instance, the time delay value can be measured relative to (e.g., as an offset from) the time of the LP-WUS 920, the time of the CSI-RS 932, the end of the current DRX cycle on-duration 902-2, the beginning of the next DRX cycle on-duration 902-3 (or the beginning of the subsequent DRX cycle on-duration in which the CSI report is to be transmitted), etc. In some aspects, the time delay value can be determined by the network entity (e.g., gNB, base station, etc.) based at least in part on a processing time for the configured receiver of the UE for the CSI reporting and measurement (e.g., a selected one of either the UE LP-WUS or the UE MR) to process the CSI-RS 932 and prepare (e.g., generate) the corresponding CSI report 934.

In some examples, the network entity can send (and the UE can receive) a request for the CSI report, as noted above. For instance, in the third DRX cycle on-duration 902-3, the UE can receive a request for the CSI report corresponding to the CSI-RS 932. In some aspects, the UE is configured by the LP-WUS 920 CSI configuration information to use the LP-WUR to receive and store CSI-RS I/Q samples for the CSI-RS 932, but not for the LP-WUR to process the CSI-RS I/Q samples to generate CSI report 934. For instance, based on the UE LP-WUR capability information, the network entity may determine that the UE LP-WUR lacks the capability to process CSI-RS I/Q samples and/or to generate a CSI report (e.g., CSI report 934). The network can subsequently transmit the request for the CSI report, which may be configured to cause the UE to use the UE MR to process the stored CSI-RS 932 I/Q samples that were previously received, measured, and/or stored by the UE LP-WUR for the CSI-RS 932. Based on receiving the request for the CSI report from the network entity, the UE MR can process the stored CSI-RS I/Q samples from the UE LP-WUR, and can generate and transmit the CSI report 934 to the network entity, responsive to the request for the CSI report from the network entity.

In some aspects, the UE can transmit as CSI report 934 the generated CSI report corresponding to the CSI-RS I/Q samples 932. For instance, the CSI report 934 can be transmitted as a delayed CSI report for CSI-RS 932 (e.g., delayed to the next or a subsequent DRX cycle on-duration 902-3, from the current DRX cycle on-duration 902-2). In another example, the UE can transmit as the CSI report 934 a copy of the most recently processed or generated CSI report from either the UE MR or the UE LP-WUS. For instance, the UE can transmit as the CSI report 934 a most recently generated CSI report corresponding to a CSI-RS received prior to the CSI-RS 932. For instance, the CSI report 934 can be a copy of the last CSI report sent by the UE for a CSI-RS received during the previous DRX cycle on-duration 902-1. The UE may be configured to transmit (e.g., re-transmit) the copy of the most recently processed CSI report as the CSI report 934 responsive to the network entity request for the CSI report in third DRX cycle on-duration 902-3 as a power saving technique, such as in instances where the network has configured a greater CSI reporting frequency than needed, supported, or sustainable at the UE.

Figure 10:
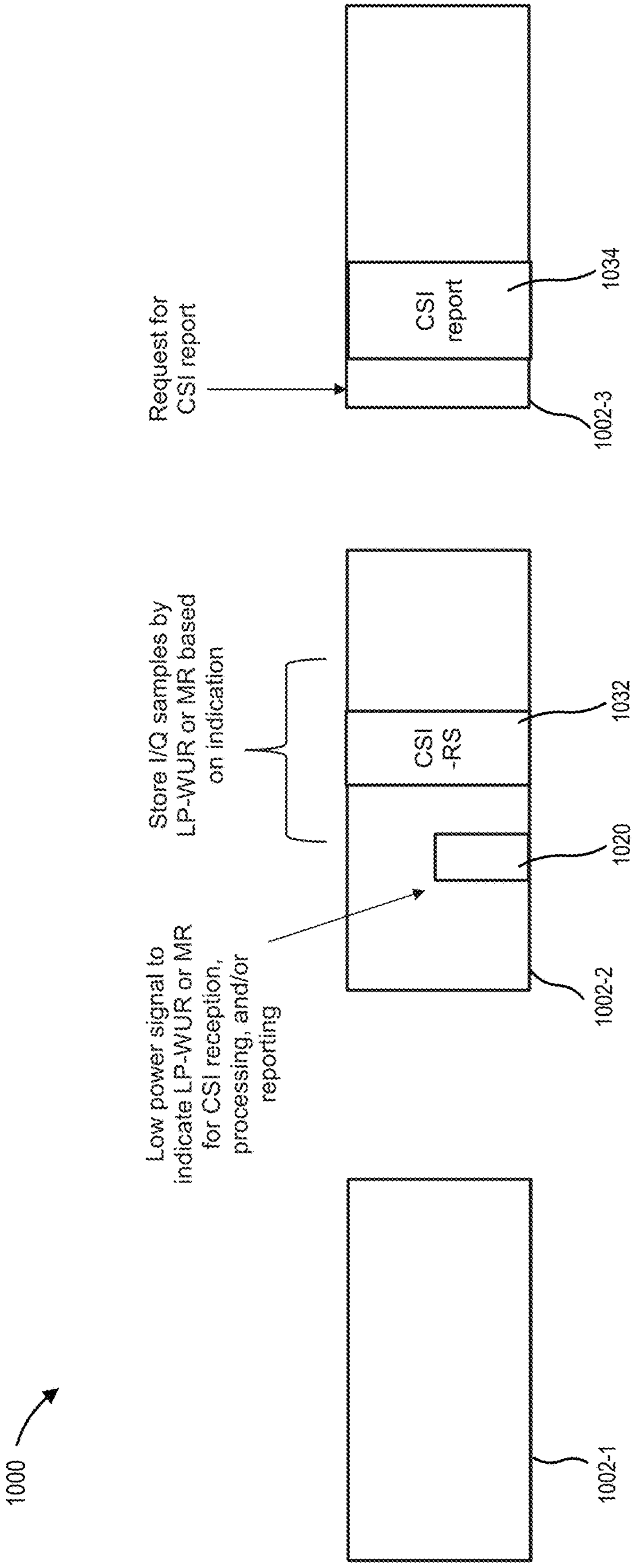
FIG. 10 is a diagram illustrating an example of CSI-RS reception, storage, and reporting based on a low power signal indicative of a configuration for an MR or LP-WUR to skip or process CSI-RS, in accordance with some examples.

FIG. 10 is a diagram illustrating an example of CSI-RS reception, storage, and reporting 1000 based on a low power signal 1020 indicative of a configuration for an MR or LP-WUR to skip or process CSI-RS, in accordance with some examples.

In some cases, a first DRX cycle on-duration 1002-1 can be the same as or similar to the first DRX cycle on-duration 802-1 of FIG. 8 and/or the first DRX cycle on-duration 902-1 of FIG. 9. A second (e.g., current) DRX cycle on-duration 1002-2 of FIG. 10 can be the same as or similar to the second (e.g., current) DRX on-cycle duration 802-2 of FIG. 8 and/or the second (e.g., current) DRX on-cycle duration 902-2 of FIG. 9. A third DRX cycle on-duration 1002-3 of FIG. 10 can be the same as or similar to the third DRX cycle on-duration 802-3 of FIG. 8 and/or the third DRX cycle on-duration 902-3 of FIG. 9.

In some cases, the low-power signal 1020 of FIG. 10 can be a low-power wake-up signal (LP-WUS). For instance, the low-power signal 1020 of FIG. 10 can be an LP-WUS 1020 that is the same as or similar to the LP-WUS 820 of FIG. 8 and/or the LP-WUS 920 of FIG. 9.

The current DRX cycle on-duration 1002-2 can include a scheduled CSI-RS reception and/or measurement occasion 1032, which may be the same as or similar to the CSI-RS occasion 832 of FIG. 8 and/or the CSI-RS occasion 932 of FIG. 9. The next (e.g., third) DRX cycle on-duration 1002-3 can include a CSI report 1034 that is the same as or similar to the CSI report 834 of FIG. 8 and/or the CSI report 934 of FIG. 9. The CSI report 1034 can correspond to the reception, measurement, and/or processing of one or more CSI I/Q samples for the CSI-RS 1032.

In one illustrative example, the network (e.g., network entity such as a base station, gNB, etc.) can receive the UE LP-WUR capability information prior to transmitting the LP-WUS 1020 indicative of the CSI configuration information for the UE. For instance, based on the UE capability to process CSI-RS (e.g., CSI-RS 1032) by both radios (e.g., both the UE MR and the UE LP-WUR, as indicated in the UE LP-WUR capability information), the network can indicate a configured receiver for CSI reception and reporting 1032 and 1034 (respectively) in the LP-WUS 1020. In some aspects, the configured receiver can be selected by the network entity by the UE MR and the UE LP-WUR based at least in part on a function of an estimated signal-to-noise ratio (SNR) of a UE-network entity link based on previous physical uplink shared channel (PUSCH) transmissions. In some aspects, the network entity can determine the configured receiver of the UE for CSI measurement and reporting (e.g., the configured receiver indicated in the LP-WUS 1020) as a function of and/or based on various channel condition estimates or channel condition information determined for a link between the UE and the network entity. The channel condition information used to determine the configured UE receiver for CSI measurement and reporting 1032, 1034 (respectively) can include the SNR of the UE-network link, the decodability of previous physical downlink shared channel (PDSCH) transmissions (e.g., based on one or more Hybrid Automatic Repeat Request (HARQ) acknowledgements (HARQ-ACKs) from the UE to the network entity), and/or sounding reference signal (SRS) transmissions, etc.

For instance, if the network entity determines that channel conditions are relatively good between the UE and the network entity, the CSI-RS 1032 and/or other SNR measurements determined by the LP-WUR of the UE for CSI-RS can be taken as relatively reliable, and the LP-WUR of the UE can be configured (e.g., by the LP-WUS 1020) to receive, measure, and process the CSI-RS 1032. If the network entity determines that channel conditions are relatively poor between the UE and the network entity, measurements from the UE LP-WUR can be taken as relatively unreliable, and the MR of the UE can be configured (E.g., by the LP-WUS 1020) to receive, measure, and/or process the CSI-RS 1032 and generate and transmit the CSI report 1034.

In some cases, the network entity and UE can agree that the UE will report (e.g., in CSI report 1034) a filtered version of the last K reports (e.g., from PDSCH or CSI-RS).

In some examples, based on the CSI configuration information of the LP-WUS 1020 and the UE LP-WUR capability information, for the case of reference signal received power (RSRP) CRI (e.g., cri-RSRP), the UE can be configured to perform processing using the UE LP-WUR (e.g., similar to radio resource management (RRM) measurements). In this example, the network entity is configured to use time division multiplexing (TDM) resources and different orthogonal frequency division multiplexing (OFDM) resources for each beamformed resource of the RSRP CRI.

In some aspects, for RSRP-based measurements (e.g., cri-RSRP, ssb-Index-RSRP, etc.), the network entity can be configured to transmit a CSI-RS (e.g., CSI-RS 1032) based on a signal compatible with the UE LP-WUR. For instance, the network entity can use a waveform for transmission of the CSI-RS 1032 that is configured to be compatible with the UE LP-WUR and/or compatible with the UE LP-WUR capability information. For instance, the network entity can use a low-power reference signal (LP-RS) similar to LP-SS for the transmission of the CSI-RS 1032.

In some examples, the UE can be configured to transmit the CSI report 1034 using the LP-WUR Tx side, in examples where the UE LP-WUR includes a Tx side. The inclusion of a LP-WUR Tx side in the UE LP-WUR can be indicated to the network entity using the UE LP-WUR capability information. In some examples, the UE can be configured to transmit the CSI report 1034 when the UE MR wakes up (e.g., next scheduled active time, such as within the next DRX cycle on-duration 1002-3 after the current DRX cycle on-duration 1002-2).

In some aspects, the timing of sending the CSI report 1034 can be determined based on the LP-WUS 1020 and/or the CSI configuration information indicated by the LP-WUS 1020. For instance, the LP-WUS 1020 may directly indicate a transmission time for the CSI report 1034 to the UE. In some examples, the LP-WUS 1020 can include information (e.g., within the CSI configuration information of the LP-WUS 1020) that the UE can use to determine the transmission time for the CSI report 1034. In some aspects, the transmission time of the CSI report 1034 can be a configured transmission time determined by the network entity and indicated by the network entity, to the UE, using the LP-WUS 1020. In another example, the transmission time for the CSI report 1034 can be based on the particular CSI-RS 1032 that is used, and/or can be based on whether the LP-WUS 1020 configures the UE LP-WUR or the UE MR as the configured receiver for receiving the CSI-RS 1032.

In some examples, the transmission time of the CSI report 1034 can be configured as a transmission time responsive to a request from the network entity (e.g., such as the request for the CSI report in third DRX cycle on-duration 1002-3 of FIG. 10). In some cases, the transmission time of the CSI report 1034 can be configured after a time duration X from the measurement of the CSI-RS 1032. For instance, the transmission time of the CSI report 1034 can be configured as the time of measurement of the CSI-RS 1032 plus a time delay value indicated by the CSI configuration information of the LP-WUS 1020 or a time delay value indicated directly by the LP-WUS 1020. The time delay value can be a time offset. In some examples, the transmission time of the CSI report 1034 can be determined based on a quality of RSRP measured by the UE LP-WUR, which can additionally be used to trigger a next measurement. In some cases, the transmission time of the CSI report 1034 can be configured as a transmission time that is after the UE MR receives a WUS and/or after the UE LP-WUS receives a WUS.

Figure 11:
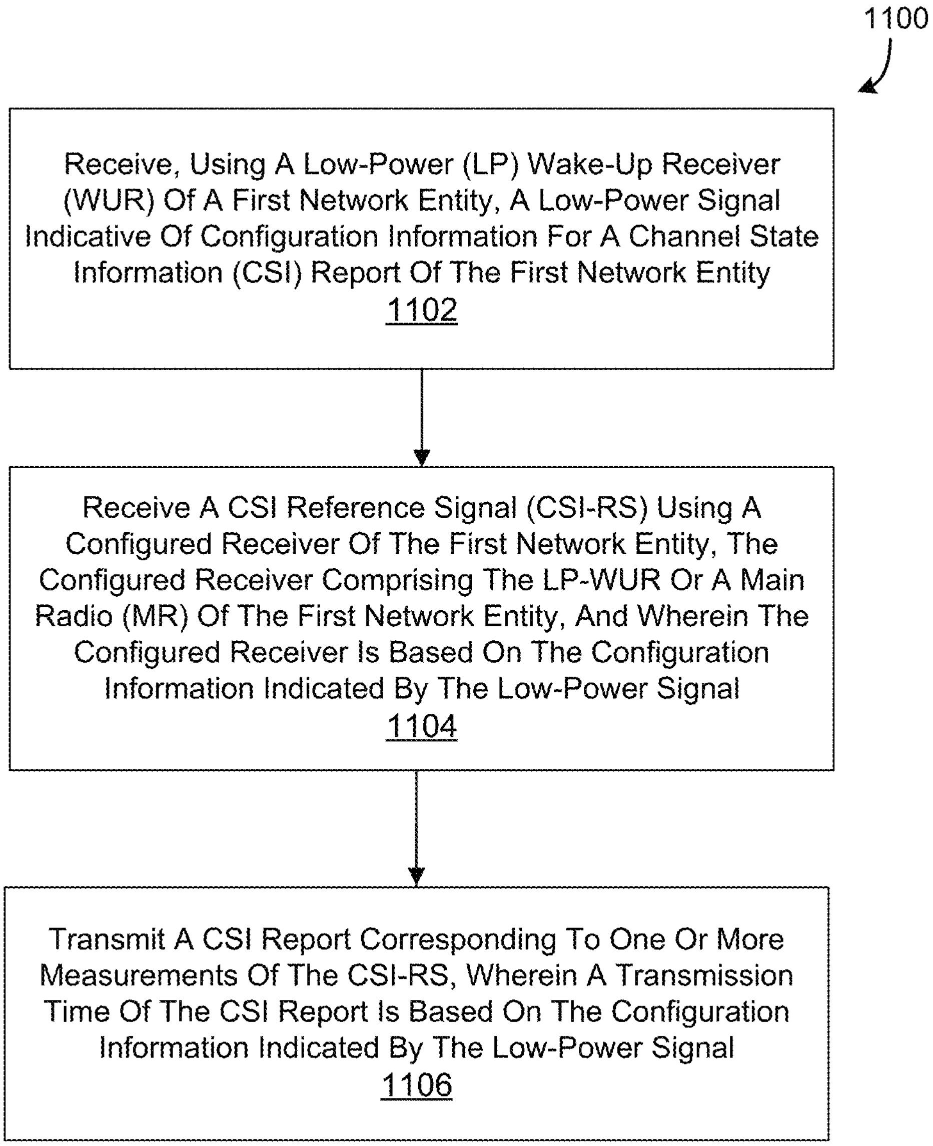
FIG. 11 is a flow diagram illustrating an example of a process for wireless communications, in accordance with some examples.

FIG. 11 is a flowchart diagram illustrating an example of a process 1100 for wireless communications. The process 1100 may be performed by a first network entity or by a component or system (e.g., a chipset) of the first network entity. The first network entity may be a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network entity. In some examples, the first network entity can be a UE that is the same as or similar to one or more of the UEs of any of FIG. 1, FIG. 2, FIG. 3, FIG. 4, etc. The operations of the process 1100 may be implemented as software components that are executed and run on one or more processors (e.g., processor 1310 of FIG. 13 or other processor(s)). Further, the transmission and reception of signals by the wireless communications device in the process 1100 may be enabled, for example, by one or more antennas and/or one or more transceivers (e.g., antenna(s) and/or wireless transceiver(s) of any of FIG. 2, FIG. 4, etc.).

At block 1102, the first network entity (or component thereof) may receive, using a low-power (LP) wake-up receiver (LP-WUR) of the first network entity, a low-power signal indicative of configuration information for a channel state information (CSI) report of the first network entity. For instance, the LP-WUR can be the same as or similar to the LP-WUR 620 of FIG. 6A. In some cases, the low-power signal is a low-power wake-up signal (LP-WUS). For instance, the low-power signal can be an LP-WUS the same as or similar to the LP-WUS of FIG. 6B. In some aspects, the low-power signal can be the same as or similar to the low-power signal 820 of FIG. 8, the low-power signal 920 of FIG. 9, and/or the low-power signal 1020 of FIG. 10, etc. In some cases, the LP-WUS is received during a deep sleep state of the MR. For instance, the LP-WUS can be received during a deep sleep state of the MR 610 of FIG. 6A.

In some examples, the configuration information indicated by the low-power signal causes the first network entity (or component thereof) to use the LP-WUR to trigger the MR to exit the deep sleep state. For instance, the LP-WUR can transmit an LP-WUS to the MR, as shown in FIG. 6B, where the LP-WUS from the LP-WUR to the MR causes the MR to exit a deep sleep state, perform a ramp up, and enter an MR wakeup period (e.g., as shown in FIG. 6B).

In some examples, the low-power signal is a low-power wake-up signal (LP-WUS), as noted above. In some cases, the LP-WUS is received during a deep sleep state of the MR, as noted above. In some examples, the configuration information indicated by the low-power signal causes the MR to remain in the deep sleep state during a scheduled CSI-RS and to skip a scheduled CSI report corresponding to the scheduled CSI-RS.

For instance, the scheduled CSI-RS can be associated with a page monitoring occasion, such as the MR page monitoring occasions shown in FIG. 6B. In some cases, the scheduled CSI-RS can be the same as or similar to one or more of the periodic CSI-RS reception 732 of FIG. 7, the CSI-RS 832 of FIG. 8, the CSI-RS 932 of FIG. 9, and/or the CSI-RS 1032 of FIG. 10. In some examples, the scheduled CSI report corresponding to the scheduled CSI-RS can be the same as or similar to one or more of the CSI report 734 of FIG. 7, the CSI report 834 of FIG. 8, the CSI report 934 of FIG. 9, and/or the CSI report 1034 of FIG. 10, etc.

At block 1104, the first network entity (or component thereof) may receive a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal.

As noted above, the CSI-RS can be the same as or similar to one or more of the periodic CSI-RS reception 732 of FIG. 7, the CSI-RS 832 of FIG. 8, the CSI-RS 932 of FIG. 9, and/or the CSI-RS 1032 of FIG. 10. In some examples, the configured receiver can comprise one of the MR 610 or the LP-WUR 620 of the network entity (e.g., UE) 600 of FIG. 6A.

In some cases, the first network entity is further configured to transmit, to a second network entity, capability information corresponding to the LP-WUR of the first network entity. The first network entity can be a UE and the second network entity can be a base station, gNB, etc. In some cases, the capability information is indicative of one or more of: a capability of the LP-WUR to receive the CSI-RS as the configured receiver of the first network entity; a capability of the LP-WUR to store the one or more measurements of the CSI-RS; or a capability of the LP-WUR to generate the CSI report based on processing the one or more measurements of the CSI-RS.

In some examples, the configuration information can indicate the LP-WUR as the configured receiver based on relatively good channel conditions of a link between the first network entity and the second network entity. For entity, the first network entity can use the LP-WUR 620 of FIG. 6A to receive a CSI-RS based on relatively good channel conditions of a link between the first network entity and the second network entity.

In some cases, the configuration information indicates the MR (e.g., such as MR 610 of FIG. 6A) as the configured receiver, based on relatively poor channel conditions of the link between the first network entity and the second network entity.

In some examples, the configuration information indicates the LP-WUR is the configured receiver for the CSI-RS. The first network entity can be configured to store, using the LP-WUR, the one or more measurements of the CSI-RS received using the LP-WUR as the configured receiver. For example, the one or more measurements of the CSI-RS can be stored by the LP-WUR based on receiving the LP-WUS 920 of FIG. 9 (e.g., where the one or more measurements stored by the LP-WUR correspond to CSI I/Q samples measured by the LP-WUR for CSI-RS 932 of FIG. 9).

In some examples, the first network entity can generate, using the LP-WUR, the CSI report corresponding to the one or more measurements of the CSI-RS stored using the LP-WUR. For example, the first network entity can use the LP-WUR to generate the CSI report 934 of FIG. 9, corresponding to the one or more CSI I/Q samples measured and stored by the LP-WUR for CSI-RS 932 of FIG. 9.

In some cases, the first network entity can trigger, using the LP-WUR, the MR to exit a deep sleep state, and can generate, using the MR, the CSI report corresponding to the one or more measurements of the CSI-RS stored using the LP-WUR.

In some cases, the first network entity can receive, from a second network entity, a CSI report request corresponding to the one or more measurements of the CSI-RS stored using the LP-WUR. For instance, the CSI report request can be the same as or similar to one or more of the request for CSI report associated with DRX on-duration 902-3 of FIG. 9, and/or the request for CSI report associated with DRX on-duration 1002-3 of FIG. 10, etc.

In some examples, the first network entity can receive the CSI-RS within a first discontinuous reception (DRX) on-duration of the first network entity. For instance, the first DRX on-duration can be the same as or similar to one or more of the DRX on-durations 802-1, 802-2, 802-3 of FIG. 8; one or more of the DRX on-durations 902-1, 902-2, 902-3 of FIG. 9; and/or one or more of the DRX on-durations 1002-1, 1002-2, 1002-3 of FIG. 10. In some cases, the first DRX on-duration can be the DRX on-duration of 802-2 of FIG. 8, used to receive the CSI-RS 832. In some cases, the first DRX on-duration can be the DRX on-duration 902-2 of FIG. 9, used to receive the CSI-RS 932. In some cases, the first DRX on-duration can be the DRX on-duration 1002-2 of FIG. 10, used to receive the CSI-RS 1032.

In some examples, the configuration information indicated by the low-power signal can include a time delay value. In some cases, based on the time delay value, the first network entity (or component thereof) can be configured to transmit the CSI report within a second DRX on-duration of the first network entity, wherein the second DRX on-duration is after the first DRX on-duration. For instance, the second DRX on-duration can be the DRX on-duration 902-3 of FIG. 9, used to transmit the CSI report 934. In some examples, the second DRX on-duration can be the DRX on-duration 1002-3 of FIG. 10, used to transmit the CSI report 1034.

At block 1106, the first network entity (or component thereof) may transmit a CSI report corresponding to one or more measurements of the CSI-RS, wherein a transmission time of the CSI report is based on the configuration information indicated by the low-power signal. For instance, as noted above, the CSI report corresponding to the one or more measurements of the CSI-RS can be the same as or similar to one or more of the CSI report 734 of FIG. 7, the CSI report 834 of FIG. 8, the CSI report 934 of FIG. 9, and/or the CSI report 1034 of FIG. 10, etc.

In some examples, the first network entity (e.g., UE) can be configured to use the configured receiver (e.g., an indicated one of the LP-WUR 620 or MR 610 of FIG. 6A, determined based on the LP-WUS received by the first network entity) to generate the CSI report corresponding to the one or more measurements of the CSI-RS. For instance, the CSI report 834 of FIG. 8 can be generated using a configured receiver comprising an indicated one of the LP-WUR 620 or MR 610 of FIG. 6A. In some examples, the CSI report 934 can be generated using a configured receiver comprising an indicated one of the LP-WUR 620 or MR 610 of FIG. 6A. In some cases, the CSI report 1034 of FIG. 10 can be generated using a configured receiver comprising an indicated one of the LP-WUR 620 or MR 610 of FIG. 6A.

In some examples, the first network entity (e.g., UE) can transmit the CSI report using the MR. In some cases, the CSI report is transmitted using the MR and the configured receiver is the LP-WUR. To transmit the CSI report using the MR, the first network entity can be configured to determine a time delay value associated with transmission of the CSI report, based on the configuration information indicated by the low-power signal. For instance, the first network entity can determine the transmission time of the CSI report based on the time delay value, and can trigger, using the LP-WUR, the MR to exit a deep sleep state at a time earlier than the transmission time. Based on triggering the MR to exit the deep sleep state, the first network entity can transmit, using the MR, the CSI report at the transmission time. In some cases, the time delay value corresponds to a CSI-RS processing time of the configured receiver or a configured time delay value included in the configuration information.

In some examples, the first network entity can be configured to receive the CSI-RS within a first discontinuous reception (DRX) on-duration of the first network entity, and based on a time delay value included in the configuration information indicated by the low-power signal, the first network entity can be configured to transmit the CSI report within a second DRX on-duration of the first network entity, wherein the second DRX on-duration is after the first DRX on-duration.

In some cases, the first network entity can be configured to determine the transmission time of the CSI report implicitly, based on which one of the LP-WUR or the MR was used to process the CSI-RS and generate the CSI report. In some examples, the first network entity can be configured to determine the transmission time of the CSI report based on a CSI report request from a second network entity. In some cases, the first network entity can be configured to determine the transmission time of the CSI report based on a time delay value included in the configuration information indicated by the low-power signal, and wherein the transmission time comprises a measurement time of the CSI-RS plus the time delay.

Figure 12:
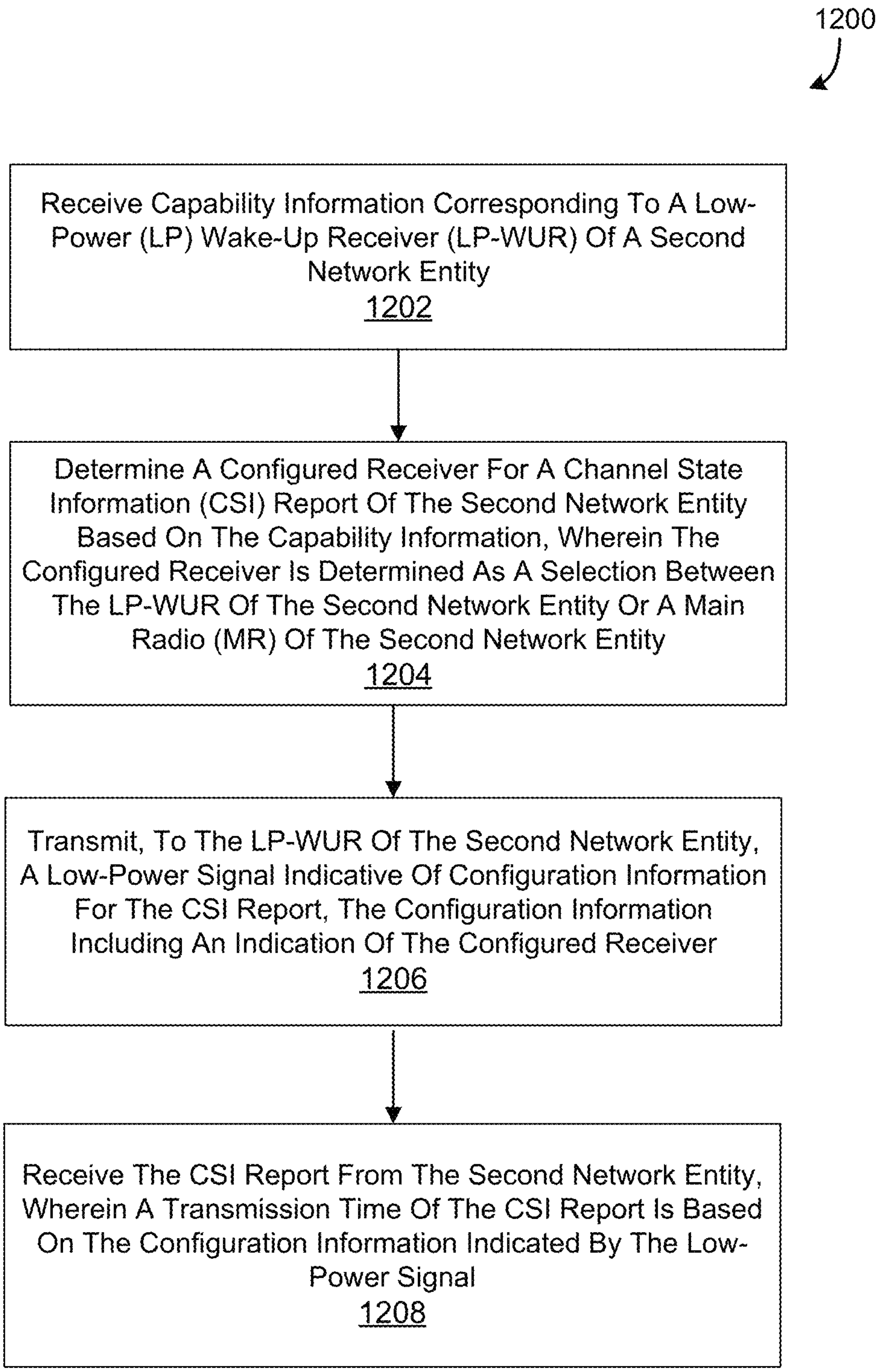
FIG. 12 is a flow diagram illustrating another example of a process for wireless communications, in accordance with some examples.

FIG. 12 is a flowchart diagram illustrating another example of a process 1200 for wireless communications. The process 1200 may be performed by a first network entity or by a component or system (e.g., a chipset) of the first network entity. The first network node may be a base station (e.g., a gNB, an eNB, or other base station), a portion of the base station (e.g., a CU, DU, RU, RIC, or other portion of a base station having a disaggregated architecture) or other type of network entity. In some examples, the first network entity can be a base station that is the same as or similar to one or more of the base stations of any of FIG. 1, FIG. 2, FIG. 3, etc. The operations of the process 1200 may be implemented as software components that are executed and run on one or more processors (e.g., processor 1310 of FIG. 13 or other processor(s)). Further, the transmission and reception of signals by the wireless communications device in the process 1200 may be enabled, for example, by one or more antennas and/or one or more transceivers (e.g., antenna(s) and/or wireless transceiver(s) of any of FIG. 2, FIG. 4, etc.).

At block 1202, the first network entity (or component thereof) may receive capability information corresponding to a low-power (LP) wake-up receiver (LP-WUR) of a second network entity.

At block 1204, the first network entity (or component thereof) may determine a configured receiver for a channel state information (CSI) report of the second network entity based on the capability information, wherein the configured receiver is determined as a selection between the LP-WUR of the second network entity or a main radio (MR) of the second network entity.

At block 1206, the first network entity (or component thereof) may transmit, to the LP-WUR of the second network entity, a low-power signal indicative of configuration information for the CSI report, the configuration information including an indication of the configured receiver.

At block 1208, the first network entity (or component thereof) may receive the CSI report from the second network entity, wherein a transmission time of the CSI report is based on the configuration information indicated by the low-power signal.

In some examples, the processes described herein (e.g., process 1100, process 1200, and/or other process described herein) may be performed by a computing device or apparatus (e.g., a network node such as a UE, base station, a portion of a base station, etc.). For instance, as noted above, the process 1100 may be performed by a UE and the process 1200 may be performed by a base station or a portion of a base station. In another example, the process 1100 and/or the process 1200 may be performed by a computing device with the computing system 1300 shown in FIG. 13. For instance, a wireless communication device with the computing architecture shown in FIG. 13 may include the components of the UE and may implement the operations of FIG. 11 and/or FIG. 12.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 1100 and the process 1200 are illustrated as a logical flow diagrams, the operation of which represent a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 1100, the process 1200, and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 13:
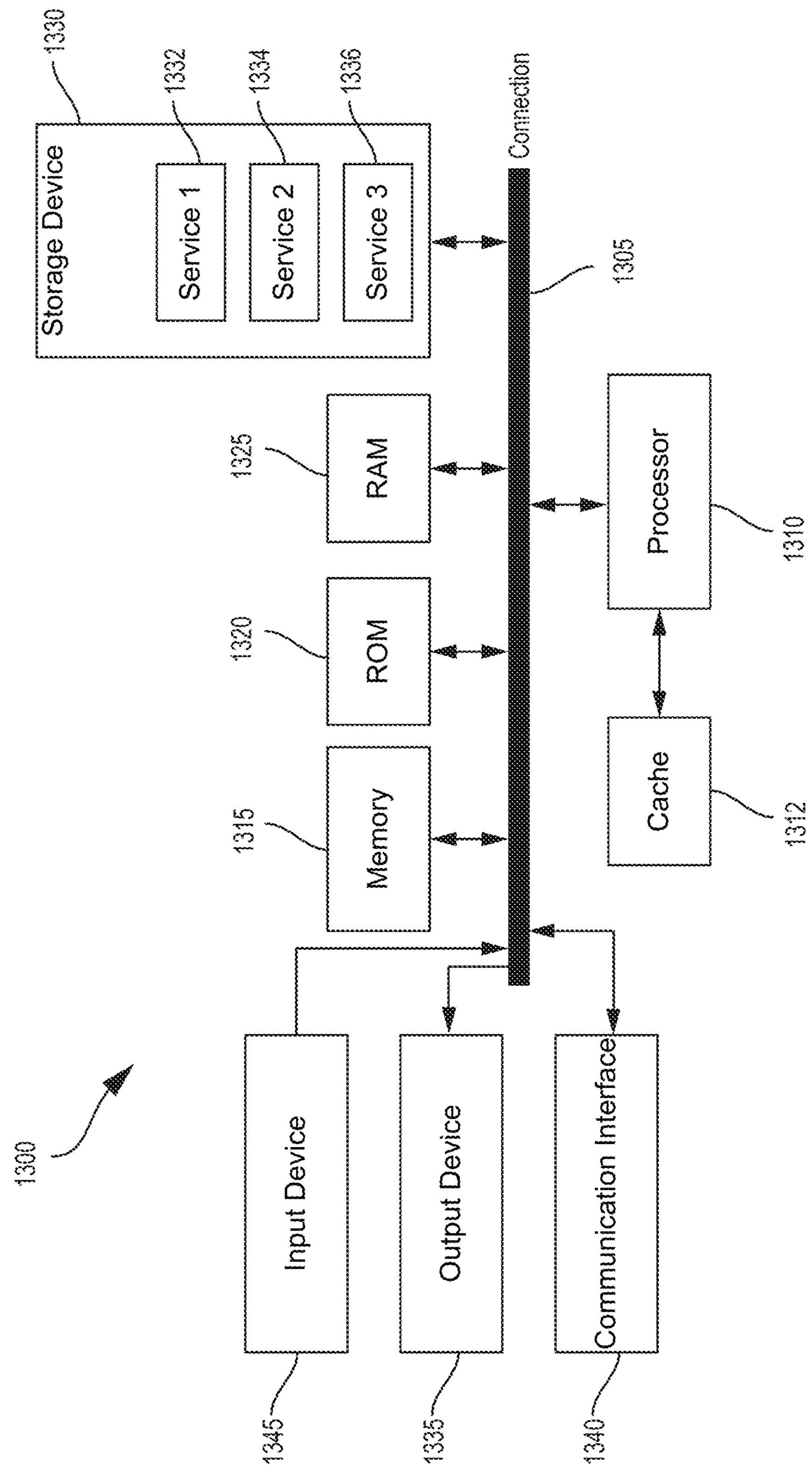
FIG. 13 is a block diagram illustrating an example of a computing system, in accordance with some examples.

FIG. 13 is a diagram illustrating an example of a system for implementing certain aspects of the present technology. In particular, FIG. 13 illustrates an example of computing system 1300, which may be for example any computing device making up internal computing system, a remote computing system, a camera, or any component thereof in which the components of the system are in communication with each other using connection 1305. Connection 1305 may be a physical connection using a bus, or a direct connection into processor 1310, such as in a chipset architecture. Connection 1305 may also be a virtual connection, networked connection, or logical connection.

In some aspects, computing system 1300 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 1300 includes at least one processing unit (CPU or processor) 1310 and connection 1305 that communicatively couples various system components including system memory 1315, such as read-only memory (ROM) 1320 and random access memory (RAM) 1325 to processor 1310. Computing system 1300 may include a cache 1315 of high-speed memory connected directly with, in close proximity to, or integrated as part of processor 1310.

Processor 1310 may include any general-purpose processor and a hardware service or software service, such as services 1332, 1334, and 1336 stored in storage device 1330, configured to control processor 1310 as well as a special-purpose processor where software instructions are incorporated into the actual processor design. Processor 1310 may essentially be a completely self-contained computing system, containing multiple cores or processors, a bus, memory controller, cache, etc. A multi-core processor may be symmetric or asymmetric.

To enable user interaction, computing system 1300 includes an input device 1345, which may represent any number of input mechanisms, such as a microphone for speech, a touch-sensitive screen for gesture or graphical input, keyboard, mouse, motion input, speech, etc. Computing system 1300 may also include output device 1335, which may be one or more of a number of output mechanisms. In some instances, multimodal systems may enable a user to provide multiple types of input/output to communicate with computing system 1300.

Computing system 1300 may include communications interface 1340, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1340 may also include one or more Global Navigation Satellite System (GNSS) receivers or transceivers that are used to determine a location of the computing system 1300 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1330 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 1330 may include software services, servers, services, etc., that when the code that defines such software is executed by the processor 1310, it causes the system to perform a function. In some aspects, a hardware service that performs a particular function may include the software component stored in a computer-readable medium in connection with the necessary hardware components, such as processor 1310, connection 1305, output device 1335, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. A first network entity for wireless communication, comprising: at least one memory; and at least one processor coupled to the at least one memory, wherein the at least one processor is configured to: receive, using a low-power (LP) wake-up receiver (LP-WUR) of the first network entity, a low-power signal indicative of configuration information for a channel state information (CSI) report of the first network entity; receive a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmit a CSI report corresponding to one or more measurements of the CSI-RS, wherein a transmission time of the CSI report is based on the configuration information indicated by the low-power signal.

Aspect 2. The first network entity of Aspect 1, wherein the low-power signal is a low-power wake-up signal (LP-WUS), and wherein the at least one processor is configured to receive the LP-WUS during a deep sleep state of the MR.

Aspect 3. The first network entity of Aspect 2, wherein the configuration information indicated by the low-power signal causes the at least one processor to use the LP-WUR to trigger the MR to exit the deep sleep state.

Aspect 4. The first network entity of any of Aspects 1 to 3, wherein the at least one processor is further configured to transmit, to a second network entity, capability information corresponding to the LP-WUR of the first network entity, wherein the capability information is indicative of one or more of: a capability of the LP-WUR to receive the CSI-RS as the configured receiver of the first network entity; a capability of the LP-WUR to store the one or more measurements of the CSI-RS; or a capability of the LP-WUR to generate the CSI report based on processing the one or more measurements of the CSI-RS.

Aspect 5. The first network entity of any of Aspects 1 to 4, wherein: the low-power signal is a low-power wake-up signal (LP-WUS); the at least one processor is configured to receive the LP-WUS during a deep sleep state of the MR; and the configuration information indicated by the low-power signal causes the MR to remain in the deep sleep state during a scheduled CSI-RS and to skip a scheduled CSI report corresponding to the scheduled CSI-RS.

Aspect 6. The first network entity of any of Aspects 1 to 5, wherein: the configuration information indicates the LP-WUR is the configured receiver for the CSI-RS; and the at least one processor is further configured to store, using the LP-WUR, the one or more measurements of the CSI-RS received using the LP-WUR as the configured receiver.

Aspect 7. The first network entity of Aspect 6, wherein the at least one processor is further configured to: generate, using the LP-WUR, the CSI report corresponding to the one or more measurements of the CSI-RS stored using the LP-WUR.

Aspect 8. The first network entity of any of Aspects 6 to 7, wherein the at least one processor is configured to: trigger, using the LP-WUR, the MR to exit a deep sleep state; and generate, using the MR, the CSI report corresponding to the one or more measurements of the CSI-RS stored using the LP-WUR.

Aspect 9. The first network entity of any of Aspects 6 to 8, wherein the at least one processor is configured to:

receive, from a second network entity, a CSI report request corresponding to the one or more measurements of the CSI-RS stored using the LP-WUR.

Aspect 10. The first network entity of any of Aspects 1 to 9, wherein the at least one processor is configured to: generate, using the configured receiver, the CSI report corresponding to the one or more measurements of the CSI-RS; and transmit the CSI report using the MR.

Aspect 11. The first network entity of Aspect 10, wherein the configured receiver is the LP-WUR, and wherein, to transmit the CSI report using the MR, the at least one processor is configured to: determine a time delay value associated with transmission of the CSI report, based on the configuration information indicated by the low-power signal; determine the transmission time of the CSI report based on the time delay value; trigger, using the LP-WUR, the MR to exit a deep sleep state at a time earlier than the transmission time; and transmit, using the MR, the CSI report at the transmission time.

Aspect 12. The first network entity of Aspect 11, wherein the time delay value corresponds to a CSI-RS processing time of the configured receiver or a configured time delay value included in the configuration information.

Aspect 13. The first network entity of any of Aspects 1 to 12, wherein: the at least one processor is configured to receive the CSI-RS within a first discontinuous reception (DRX) on-duration of the first network entity; and based on a time delay value included in the configuration information indicated by the low-power signal, the at least one processor is configured to transmit the CSI report within a second DRX on-duration of the first network entity, wherein the second DRX on-duration is after the first DRX on-duration.

Aspect 14. The first network entity of any of Aspects 1 to 13, wherein the configuration information indicates the LP-WUR as the configured receiver based on relatively good channel conditions of a link between the first network entity and a second network entity, and wherein the configuration information indicates the MR as the configured receiver based on relatively poor channel conditions of the link between the first network entity and the second network entity.

Aspect 15. The first network entity of any of Aspects 1 to 14, wherein the at least one processor is configured to determine the transmission time of the CSI report implicitly, based on which one of the LP-WUR or the MR was used to process the CSI-RS and generate the CSI report.

Aspect 16. The first network entity of any of Aspects 1 to 15, wherein the at least one processor is configured to determine the transmission time of the CSI report based on a CSI report request from a second network entity.

Aspect 17. The first network entity of any of Aspects 1 to 16, wherein the at least one processor is configured to determine the transmission time of the CSI report based on a time delay value included in the configuration information indicated by the low-power signal, and wherein the transmission time comprises a measurement time of the CSI-RS plus the time delay value.

Aspect 18. A method for wireless communication at a first network entity, the method comprising: receiving, using a low-power (LP) wake-up receiver (LP-WUR) of the first network entity, a low-power signal indicative of configuration information for a channel state information (CSI) report of the first network entity; receiving a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmitting a CSI report corresponding to one or more measurements of the CSI-RS, wherein a transmission time of the CSI report is based on the configuration information indicated by the low-power signal.

Aspect 19. The method of Aspect 18, wherein the low-power signal is a low-power wake-up signal (LP-WUS), and wherein the at least one processor is configured to receive the LP-WUS during a deep sleep state of the MR.

Aspect 20. The method of Aspect 19, wherein the configuration information indicated by the low-power signal causes the at least one processor to use the LP-WUR to trigger the MR to exit the deep sleep state.

Aspect 21. The method of any of Aspects 18 to 20, further comprising transmitting, to a second network entity, capability information corresponding to the LP-WUR of the first network entity, wherein the capability information is indicative of one or more of: a capability of the LP-WUR to receive the CSI-RS as the configured receiver of the first network entity; a capability of the LP-WUR to store the one or more measurements of the CSI-RS; or a capability of the LP-WUR to generate the CSI report based on processing the one or more measurements of the CSI-RS.

Aspect 22. The method of any of Aspects 18 to 21, wherein: the low-power signal is a low-power wake-up signal (LP-WUS); the at least one processor is configured to receive the LP-WUS during a deep sleep state of the MR; and the configuration information indicated by the low-power signal causes the MR to remain in the deep sleep state during a scheduled CSI-RS and to skip a scheduled CSI report corresponding to the scheduled CSI-RS.

Aspect 23. The method of any of Aspects 18 to 22, wherein: the configuration information indicates the LP-WUR is the configured receiver for the CSI-RS; and the at least one processor is further configured to store, using the LP-WUR, the one or more measurements of the CSI-RS received using the LP-WUR as the configured receiver.

Aspect 24. The method of Aspect 23, further comprising: generating, using the LP-WUR, the CSI report corresponding to the one or more measurements of the CSI-RS stored using the LP-WUR.

Aspect 25. The method of any of Aspects 23 to 24, further comprising: triggering, using the LP-WUR, the MR to exit a deep sleep state; and generating, using the MR, the CSI report corresponding to the one or more measurements of the CSI-RS stored using the LP-WUR.

Aspect 26. The method of any of Aspects 23 to 25, further comprising: receiving, from a second network entity, a CSI report request corresponding to the one or more measurements of the CSI-RS stored using the LP-WUR.

Aspect 27. The method of any of Aspects 18 to 26, further comprising: generating, using the configured receiver, the CSI report corresponding to the one or more measurements of the CSI-RS; and transmitting the CSI report using the MR.

Aspect 28. The method of Aspect 27, wherein the configured receiver is the LP-WUR, and wherein transmitting the CSI report using the MR comprises: determining a time delay value associated with transmission of the CSI report, based on the configuration information indicated by the low-power signal; determining the transmission time of the CSI report based on the time delay value; triggering, using the LP-WUR, the MR to exit a deep sleep state at a time earlier than the transmission time; and transmitting, using the MR, the CSI report at the transmission time.

Aspect 29. A first network entity for wireless communication, comprising: at least one memory; and at least one processor coupled to the at least one memory, wherein the at least one processor is configured to: receive capability information corresponding to a low-power (LP) wake-up receiver (LP-WUR) of a second network entity; determine a configured receiver for a channel state information (CSI) report of the second network entity based on the capability information, wherein the configured receiver is determined as a selection between the LP-WUR of the second network entity or a main radio (MR) of the second network entity; transmit, to the LP-WUR of the second network entity, a low-power signal indicative of configuration information for the CSI report, the configuration information including an indication of the configured receiver; and receive the CSI report from the second network entity, wherein a transmission time of the CSI report is based on the configuration information indicated by the low-power signal.

Aspect 30. A method for wireless communication at a first network entity, the method comprising: receiving capability information corresponding to a low-power (LP) wake-up receiver (LP-WUR) of a second network entity; determining a configured receiver for a channel state information (CSI) report of the second network entity based on the capability information, wherein the configured receiver is determined as a selection between the LP-WUR of the second network entity or a main radio (MR) of the second network entity; transmitting, to the LP-WUR of the second network entity, a low-power signal indicative of configuration information for the CSI report, the configuration information including an indication of the configured receiver; and receiving the CSI report from the second network entity, wherein a transmission time of the CSI report is based on the configuration information indicated by the low-power signal.

Aspect 31. A method comprising performing operations according to any of Aspects 1 to 17.

Aspect 32. An apparatus for wireless communication comprising one or more means for performing operations according to any of Aspects 1 to 17.

Aspect 33. A non-transitory computer-readable storage medium comprising instructions stored thereon which, when executed by at least one processor, causes the at least one processor to perform operations according to any of Aspects 1 to 17.

Aspect 34. An apparatus for wireless communication comprising one or more means for performing operations according to any of Aspects 18 to 28.

Aspect 35. A non-transitory computer-readable storage medium comprising instructions stored thereon which, when executed by at least one processor, causes the at least one processor to perform operations according to any of Aspects 18 to 28.

Aspect 36. An apparatus for wireless communication comprising one or more means for performing operations according to Aspect 29.

Aspect 37. A non-transitory computer-readable storage medium comprising instructions stored thereon which, when executed by at least one processor, causes the at least one processor to perform operations according to Aspect 29.

Aspect 38. An apparatus for wireless communication comprising one or more means for performing operations according to Aspect 30.

Aspect 39. A non-transitory computer-readable storage medium comprising instructions stored thereon which, when executed by at least one processor, causes the at least one processor to perform operations according to Aspect 30.

What is claimed is:

1. A first network entity for wireless communication, comprising:

at least one memory; and at least one processor coupled to the at least one memory, wherein the at least one processor is configured to:

receive, using a low-power (LP) wake-up receiver (LP-WUR) of the first network entity, a low-power signal indicative of configuration information for a channel state information (CSI) report of the first network entity;

receive a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmit a CSI report corresponding to one or more measurements of the CSI-RS, wherein a transmission time of the CSI report is based on the configuration information indicated by the low-power signal and which one of the LP-WUR or the MR was used to process the CSI-RS and generate the CSI report, and wherein the at least one processor is configured to determine the transmission time of the CSI report based on a CSI report request from a second network entity.

2. The first network entity of claim 1, wherein the low-power signal is a low-power wake-up signal (LP-WUS), and wherein the at least one processor is configured to receive the LP-WUS during a deep sleep state of the MR.

3. The first network entity of claim 2, wherein the configuration information indicated by the low-power signal causes the at least one processor to use the LP-WUR to trigger the MR to exit the deep sleep state.

4. The first network entity of claim 1, wherein the at least one processor is further configured to transmit, to the second network entity, capability information corresponding to the LP-WUR of the first network entity, wherein the capability information is indicative of one or more of:

a capability of the LP-WUR to receive the CSI-RS as the configured receiver of the first network entity;

a capability of the LP-WUR to store the one or more measurements of the CSI-RS; or a capability of the LP-WUR to generate the CSI report based on processing the one or more measurements of the CSI-RS.

5. The first network entity of claim 1, wherein:

the low-power signal is a low-power wake-up signal (LP-WUS);

the at least one processor is configured to receive the LP-WUS during a deep sleep state of the MR; and the configuration information indicated by the low-power signal causes the MR to remain in the deep sleep state during a scheduled CSI-RS and to skip a scheduled CSI report corresponding to the scheduled CSI-RS.

6. The first network entity of claim 1, wherein:

the configuration information indicates the LP-WUR is the configured receiver for the CSI-RS; and the at least one processor is further configured to store, using the LP-WUR, the one or more measurements of the CSI-RS received using the LP-WUR as the configured receiver.

7. The first network entity of claim 6, wherein the at least one processor is further configured to:

generate, using the LP-WUR, the CSI report corresponding to the one or more measurements of the CSI-RS stored using the LP-WUR.

8. The first network entity of claim 6, wherein the at least one processor is configured to:

trigger, using the LP-WUR, the MR to exit a deep sleep state; and generate, using the MR, the CSI report corresponding to the one or more measurements of the CSI-RS stored using the LP-WUR.

9. The first network entity of claim 6, wherein the at least one processor is configured to:

receive, from the second network entity, the CSI report request, wherein the CSI report request corresponds to the one or more measurements of the CSI-RS stored using the LP-WUR.

10. The first network entity of claim 1, wherein the at least one processor is configured to:

generate, using the configured receiver, the CSI report corresponding to the one or more measurements of the CSI-RS; and transmit the CSI report using the MR.

11. The first network entity of claim 10, wherein the configured receiver is the LP-WUR, and wherein, to transmit the CSI report using the MR, the at least one processor is configured to:

determine a time delay value associated with transmission of the CSI report, based on the configuration information indicated by the low-power signal;

determine the transmission time of the CSI report based on the time delay value;

trigger, using the LP-WUR, the MR to exit a deep sleep state at a time earlier than the transmission time; and transmit, using the MR, the CSI report at the transmission time.

12. The first network entity of claim 11, wherein the time delay value corresponds to a CSI-RS processing time of the configured receiver or a configured time delay value included in the configuration information.

13. The first network entity of claim 1, wherein:

the at least one processor is configured to receive the CSI-RS within a first discontinuous reception (DRX) on-duration of the first network entity; and based on a time delay value included in the configuration information indicated by the low-power signal, the at least one processor is configured to transmit the CSI report within a second DRX on-duration of the first network entity, wherein the second DRX on-duration is after the first DRX on-duration.

14. The first network entity of claim 1, wherein the configuration information indicates the LP-WUR as the configured receiver based on relatively good channel conditions of a link between the first network entity and the second network entity, and wherein the configuration information indicates the MR as the configured receiver based on relatively poor channel conditions of the link between the first network entity and the second network entity.

15. The first network entity of claim 1, wherein the at least one processor is configured to determine the transmission time of the CSI report based on a time delay value included in the configuration information indicated by the low-power signal, and wherein the transmission time comprises a measurement time of the CSI-RS plus the time delay value.

16. A method for wireless communication at a first network entity, the method comprising:

receiving, using a low-power (LP) wake-up receiver (LP-WUR) of the first network entity, a low-power signal indicative of configuration information for a channel state information (CSI) report of the first network entity;

receiving a CSI reference signal (CSI-RS) using a configured receiver of the first network entity, the configured receiver comprising the LP-WUR or a main radio (MR) of the first network entity, and wherein the configured receiver is based on the configuration information indicated by the low-power signal; and transmitting a CSI report corresponding to one or more measurements of the CSI-RS, wherein a transmission time of the CSI report is based on the configuration information indicated by the low-power signal and which one of the LP-WUR or the MR was used to process the CSI-RS and generate the CSI report, and wherein the transmission time of the CSI report is determined based on a CSI report request from a second network entity.

17. The method of claim 16, wherein the low-power signal is a low-power wake-up signal (LP-WUS), and wherein the LP-WUS is received during a deep sleep state of the MR.

18. The method of claim 17, wherein the configuration information indicated by the low-power signal causes the LP-WUR to trigger the MR to exit the deep sleep state.

19. The method of claim 16, further comprising transmitting, to the second network entity, capability information corresponding to the LP-WUR of the first network entity, wherein the capability information is indicative of one or more of:

a capability of the LP-WUR to receive the CSI-RS as the configured receiver of the first network entity;

a capability of the LP-WUR to store the one or more measurements of the CSI-RS; or a capability of the LP-WUR to generate the CSI report based on processing the one or more measurements of the CSI-RS.

20. The method of claim 16, wherein:

the low-power signal is a low-power wake-up signal (LP-WUS);

the LP-WUS is received during a deep sleep state of the MR; and the configuration information indicated by the low-power signal causes the MR to remain in the deep sleep state during a scheduled CSI-RS and to skip a scheduled CSI report corresponding to the scheduled CSI-RS.

21. The method of claim 16, wherein:

the configuration information indicates the LP-WUR is the configured receiver for the CSI-RS; and the method further comprises using the LP-WUR to store the one or more measurements of the CSI-RS received using the LP-WUR as the configured receiver.

22. The method of claim 21, further comprising:

generating, using the LP-WUR, the CSI report corresponding to the one or more measurements of the CSI-RS stored using the LP-WUR.

23. The method of claim 21, further comprising:

triggering, using the LP-WUR, the MR to exit a deep sleep state; and generating, using the MR, the CSI report corresponding to the one or more measurements of the CSI-RS stored using the LP-WUR.

24. The method of claim 21, further comprising:

receiving, from the second network entity, the CSI report request, wherein the CSI report request corresponds to the one or more measurements of the CSI-RS stored using the LP-WUR.

25. The method of claim 16, further comprising:

generating, using the configured receiver, the CSI report corresponding to the one or more measurements of the CSI-RS; and transmitting the CSI report using the MR.

26. The method of claim 25, wherein the configured receiver is the LP-WUR, and wherein transmitting the CSI report using the MR comprises:

determining a time delay value associated with transmission of the CSI report, based on the configuration information indicated by the low-power signal;

determining the transmission time of the CSI report based on the time delay value;

triggering, using the LP-WUR, the MR to exit a deep sleep state at a time earlier than the transmission time; and transmitting, using the MR, the CSI report at the transmission time.

27. A first network entity for wireless communication, comprising:

at least one memory; and at least one processor coupled to the at least one memory, wherein the at least one processor is configured to:

receive capability information corresponding to a low-power (LP) wake-up receiver (LP-WUR) of a second network entity;

determine a configured receiver for a channel state information (CSI) report of the second network entity based on the capability information, wherein the configured receiver is determined as a selection between the LP-WUR of the second network entity or a main radio (MR) of the second network entity;

transmit, to the LP-WUR of the second network entity, a low-power signal indicative of configuration information for the CSI report, the configuration information including an indication of the configured receiver; and receive the CSI report from the second network entity, wherein a transmission time of the CSI report is based on the configuration information indicated by the low-power signal and which one of the LP-WUR or the MR of the second network entity was used to process a CSI reference signal (CSI-RS) and generate the CSI report, and wherein the transmission time of the CSI report is determined based on a CSI report request from the first network entity.

28. A method for wireless communication at a first network entity, the method comprising:

receiving capability information corresponding to a low-power (LP) wake-up receiver (LP-WUR) of a second network entity;

determining a configured receiver for a channel state information (CSI) report of the second network entity based on the capability information, wherein the configured receiver is determined as a selection between the LP-WUR of the second network entity or a main radio (MR) of the second network entity;

transmitting, to the LP-WUR of the second network entity, a low-power signal indicative of configuration information for the CSI report, the configuration information including an indication of the configured receiver; and receiving the CSI report from the second network entity, wherein a transmission time of the CSI report is based on the configuration information indicated by the low-power signal and which one of the LP-WUR or the MR of the second network entity was used to process a CSI reference signal (CSI-RS) and generate the CSI report, and wherein the transmission time of the CSI report is determined based on a CSI report request from the first network entity.

* * * * *